Dec. 10, 1935. L. M. SCHUNE 2,023,648
MACHINE FOR MANUFACTURING ZIP FASTENERS
Filed June 21, 1933   16 Sheets-Sheet 1
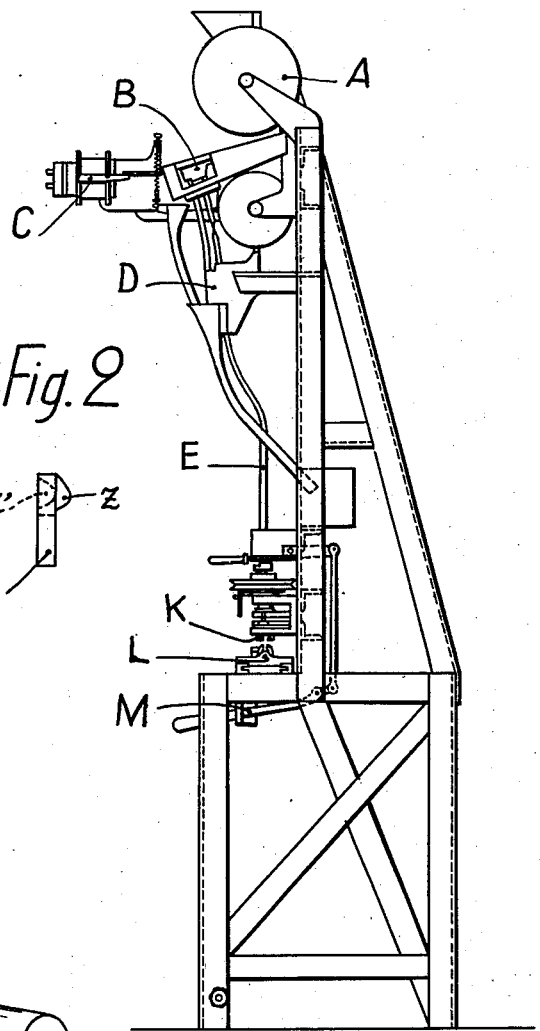
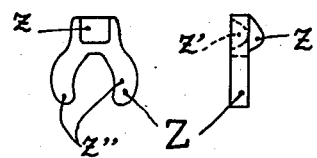
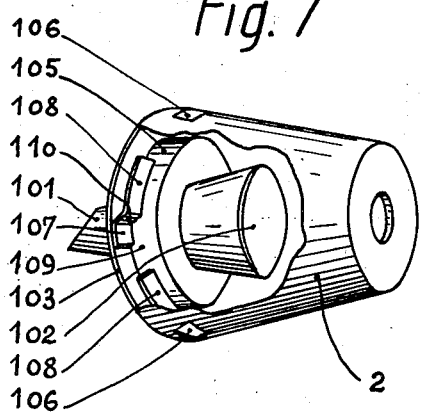
Inventor:
Lucien Marcel Schune Dec. 10, 1935.   L. M. SCHUNE   2,023,648
MACHINE FOR MANUFACTURING ZIP FASTENERS
Filed June 21, 1933    16 Sheets-Sheet 2

Inventor:
Lucien Marcel Schune

Dec. 10, 1935.   L. M. SCHUNE   2,023,648
MACHINE FOR MANUFACTURING ZIP FASTENERS
Filed June 21, 1933   16 Sheets-Sheet 3
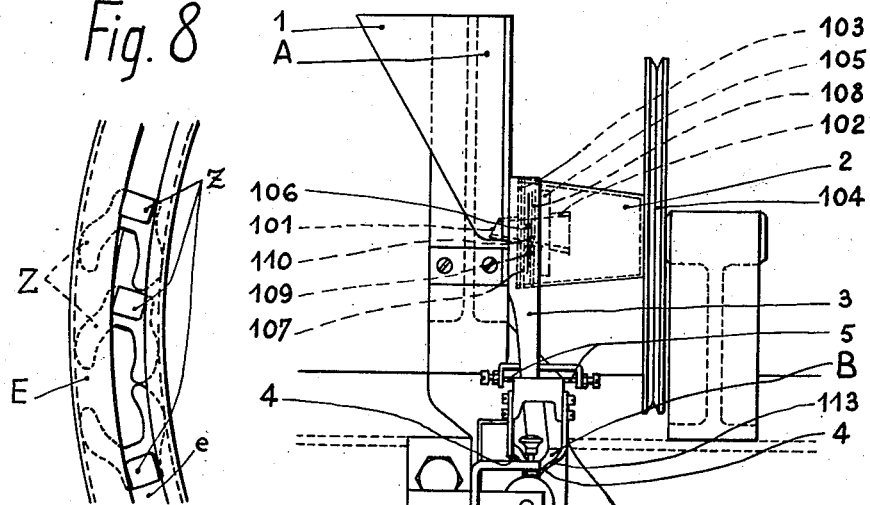
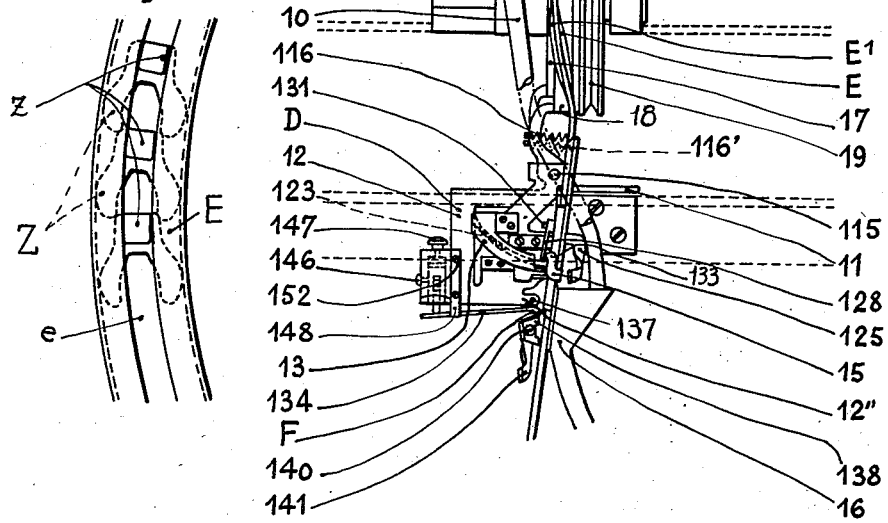
Inventor:
Lucien Marcel Schune Dec. 10, 1935.　　　L. M. SCHUNE　　　2,023,648
MACHINE FOR MANUFACTURING ZIP FASTENERS
Filed June 21, 1933　　16 Sheets-Sheet 4
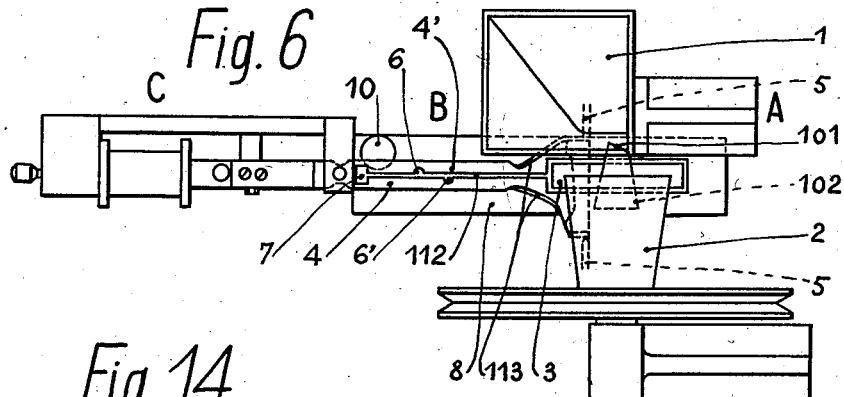
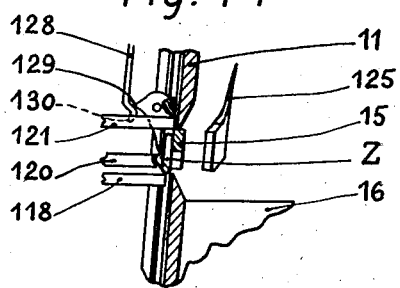
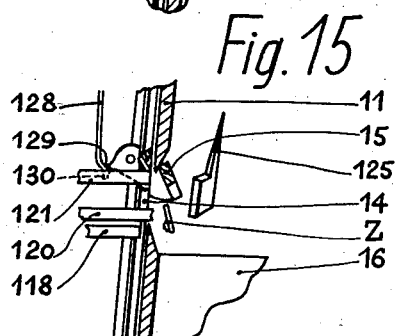
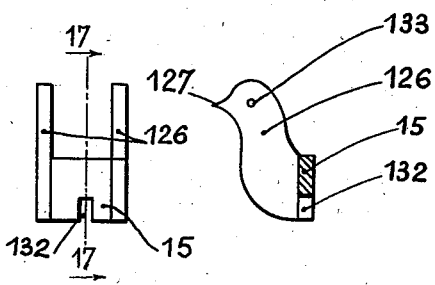
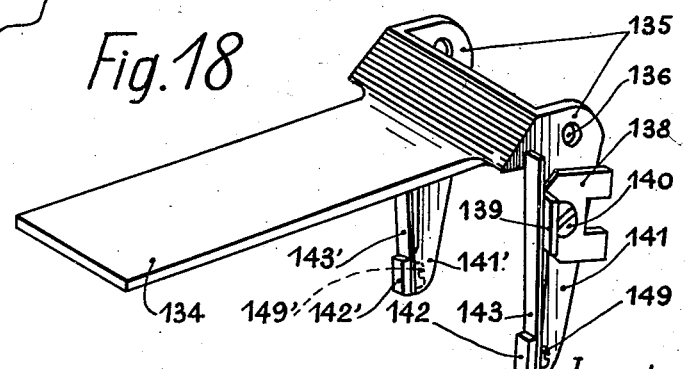
Inventor:
Lucien Marcel Schune Dec. 10, 1935.　　　　L. M. SCHUNE　　　　2,023,648
MACHINE FOR MANUFACTURING ZIP FASTENERS
Filed June 21, 1933　　　16 Sheets-Sheet 5
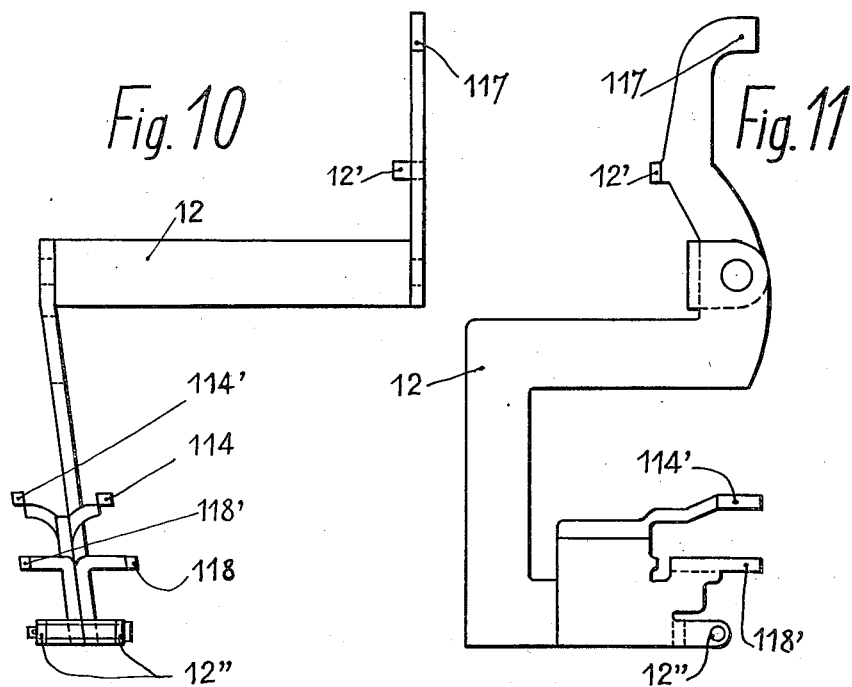
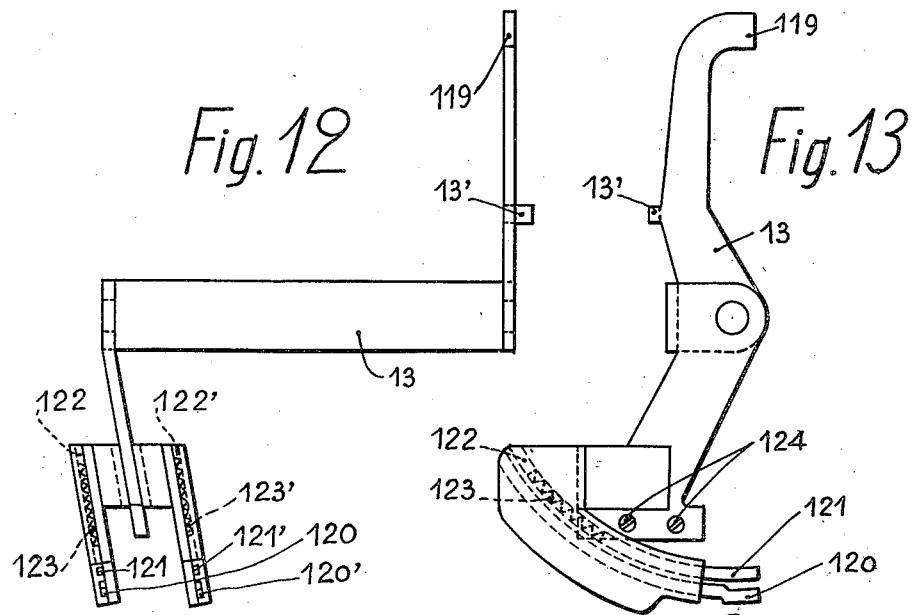
Inventor:
Lucien Marcel Schune Dec. 10, 1935.      L. M. SCHUNE      2,023,648
MACHINE FOR MANUFACTURING ZIP FASTENERS
Filed June 21, 1933      16 Sheets-Sheet 6
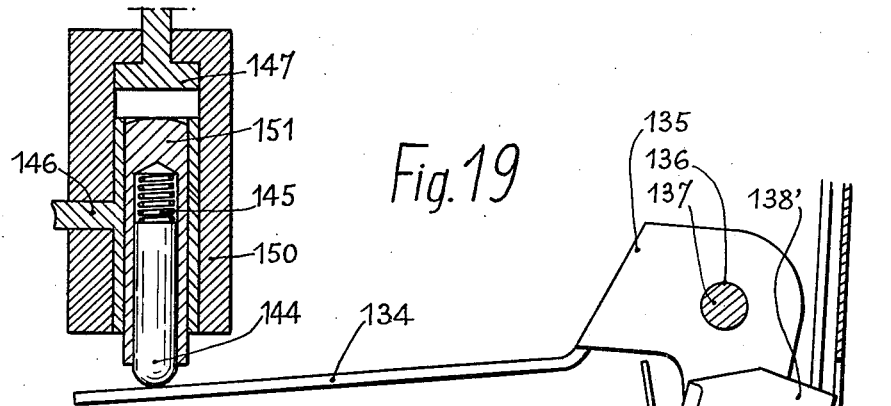
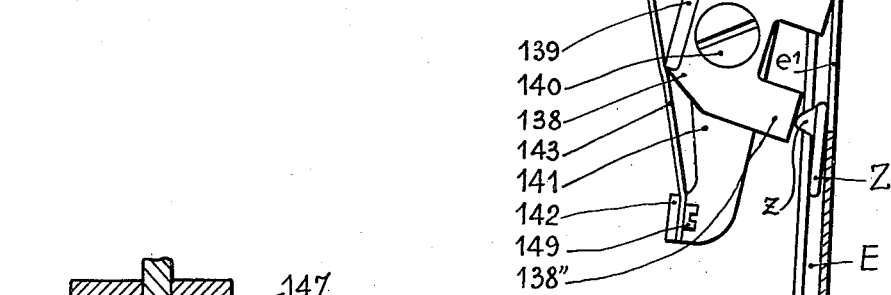
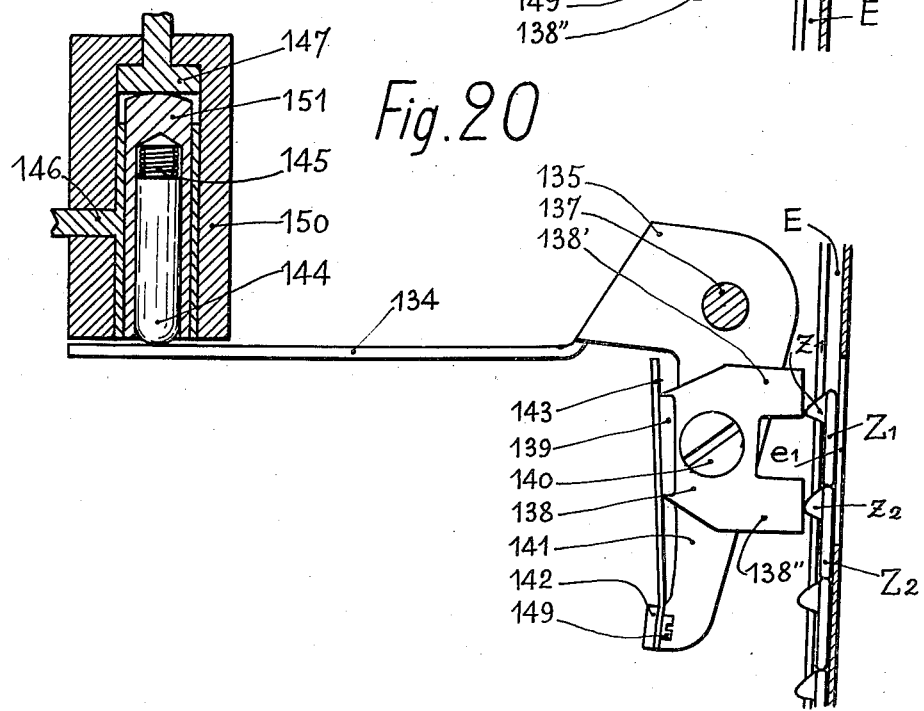
Inventor:
Lucien Marcel Schune Dec. 10, 1935.   L. M. SCHUNE   2,023,648
MACHINE FOR MANUFACTURING ZIP FASTENERS
Filed June 21, 1933    16 Sheets-Sheet 7
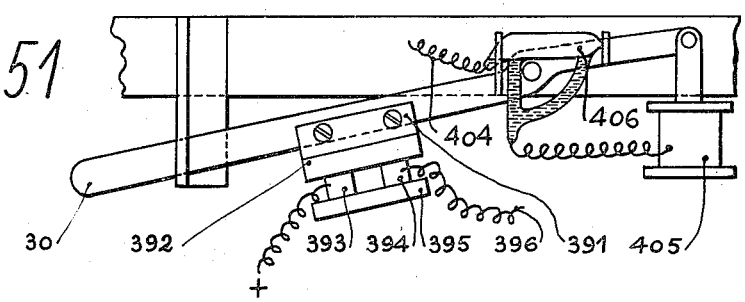
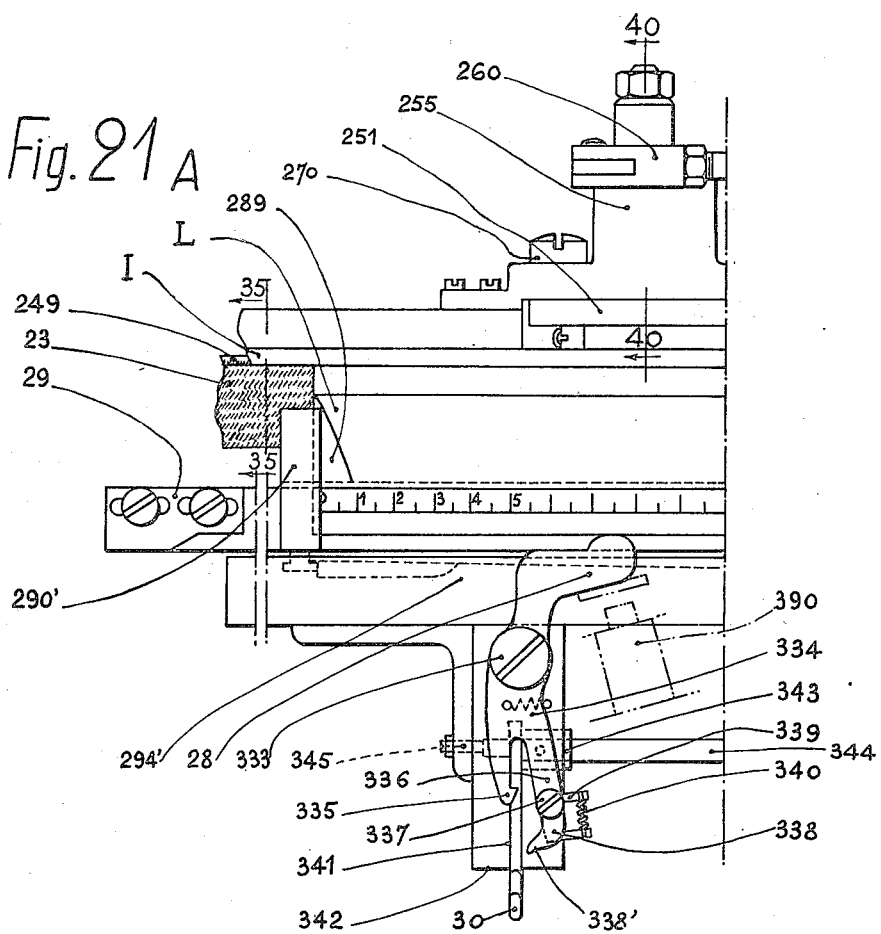
Inventor:
Lucien Marcel Schune

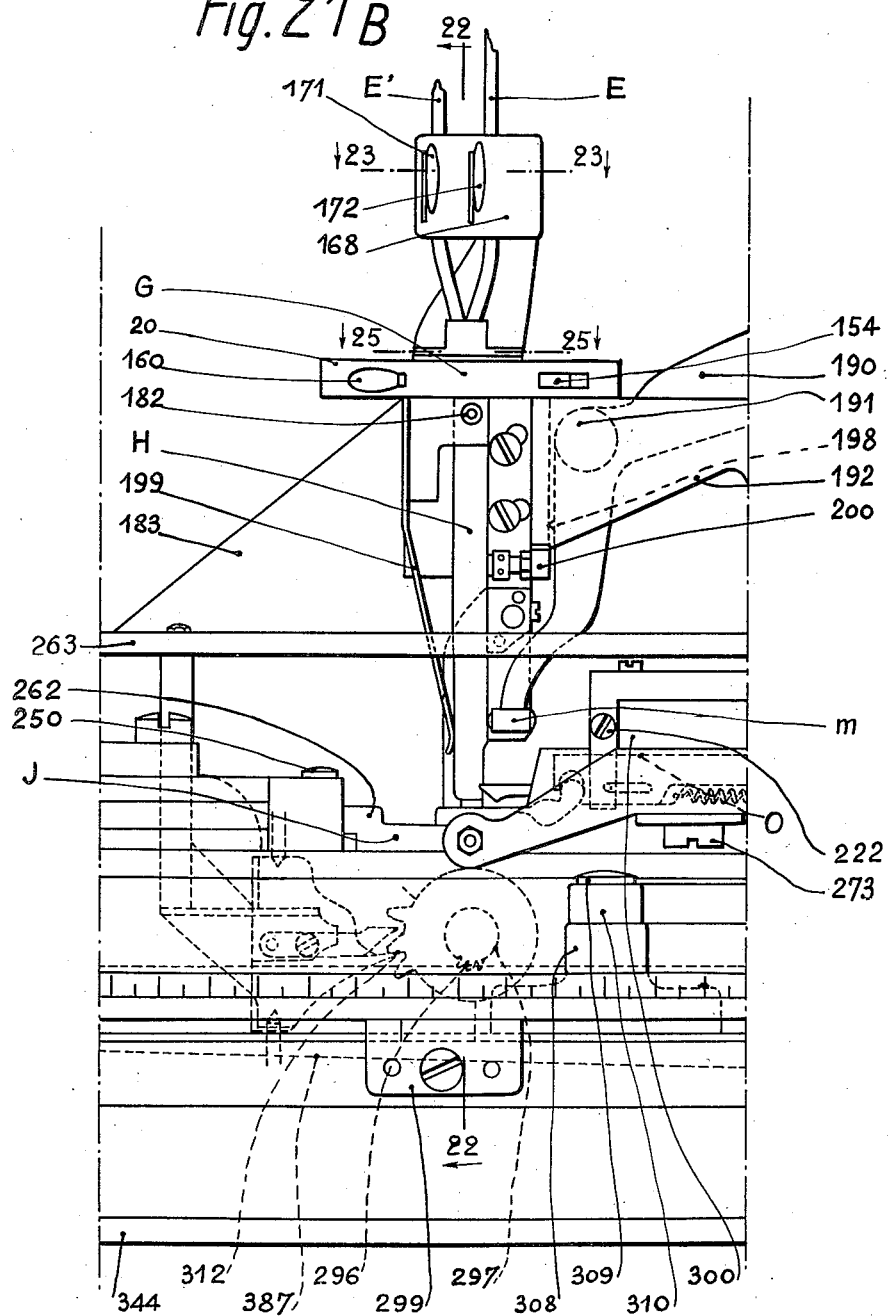

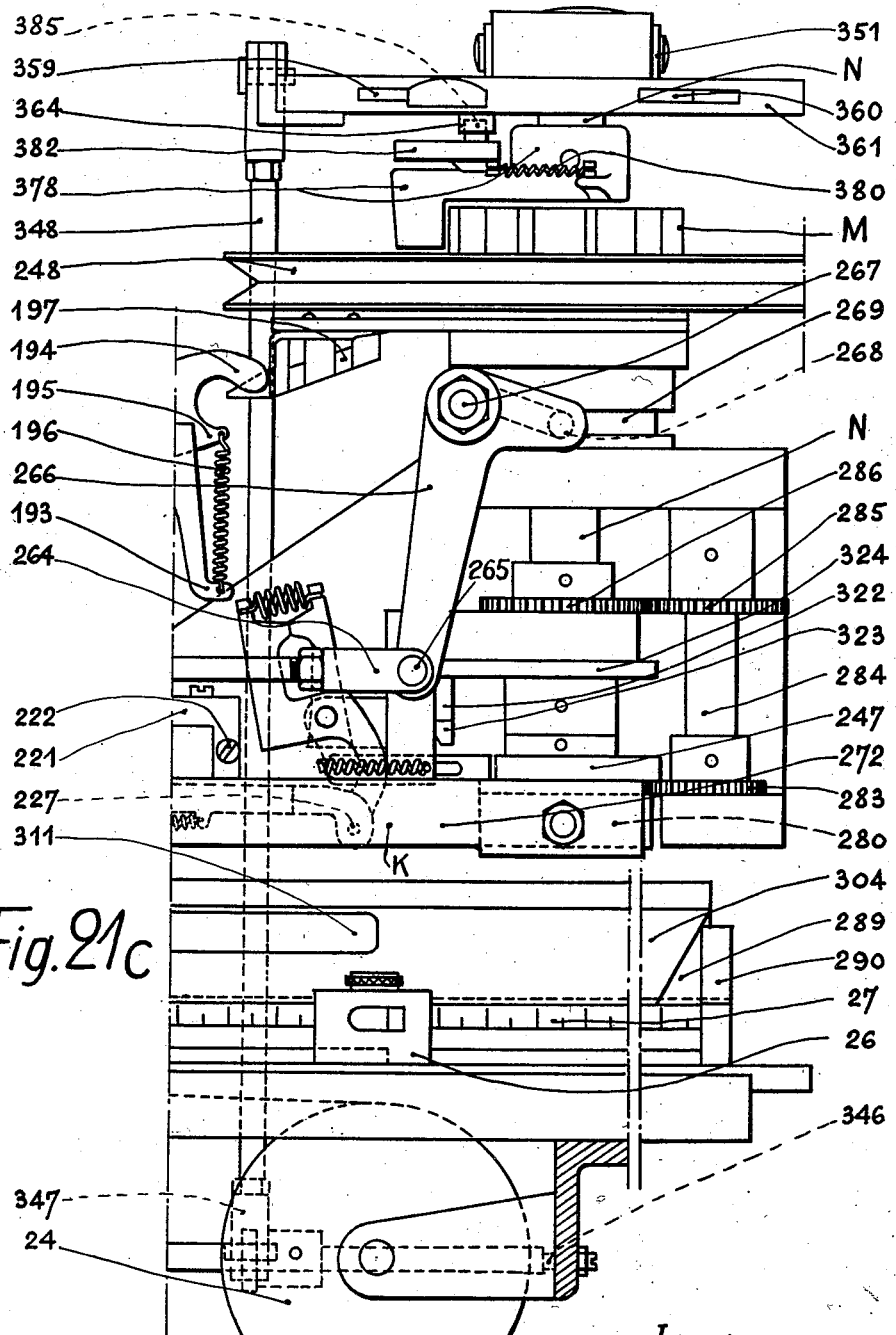

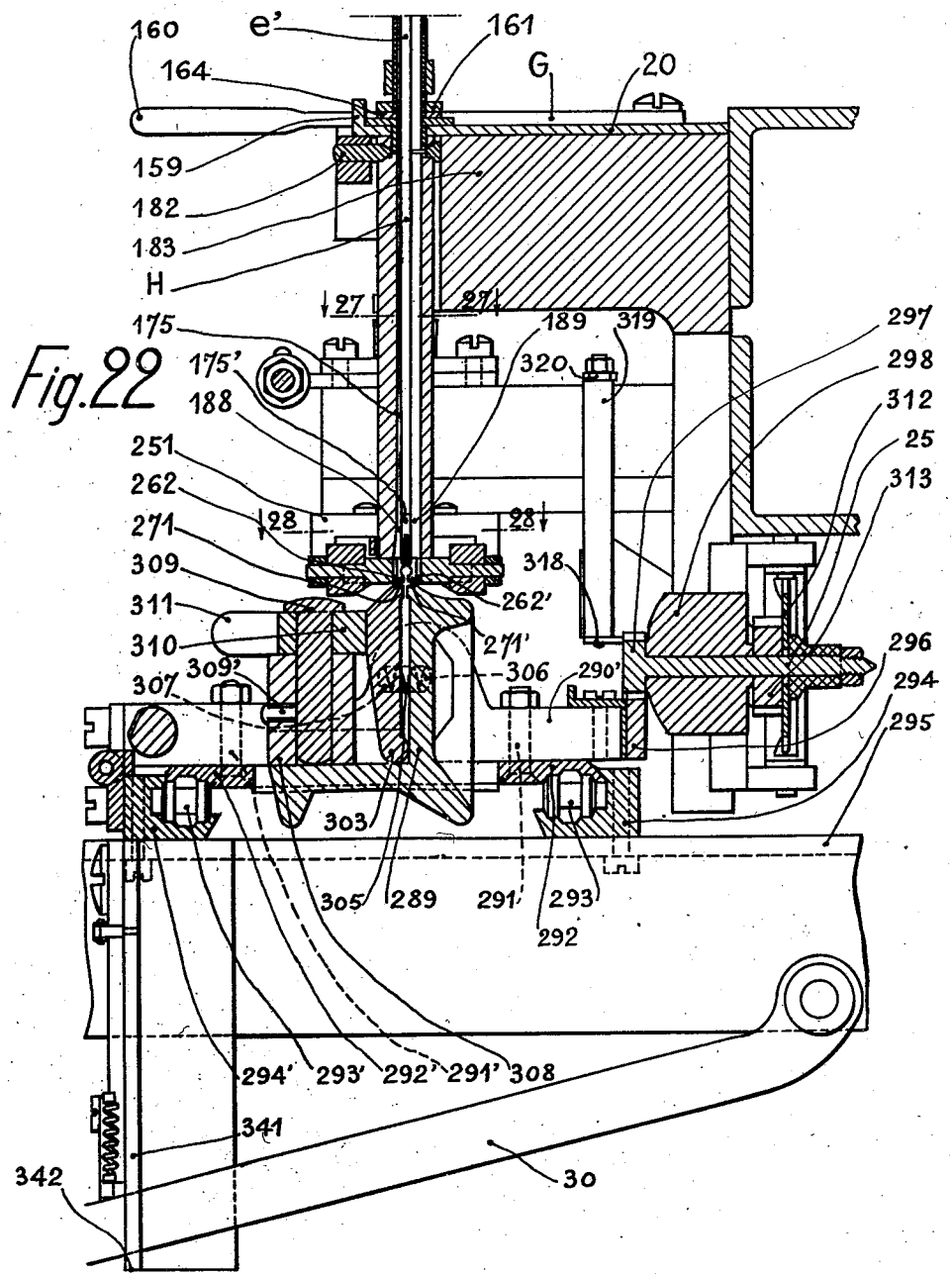

Dec. 10, 1935.  L. M. SCHUNE  2,023,648
MACHINE FOR MANUFACTURING ZIP FASTENERS
Filed June 21, 1933   16 Sheets-Sheet 11
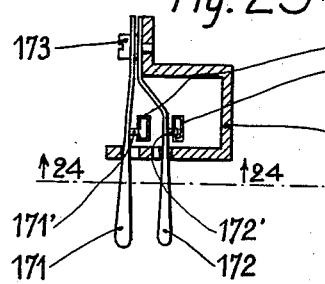
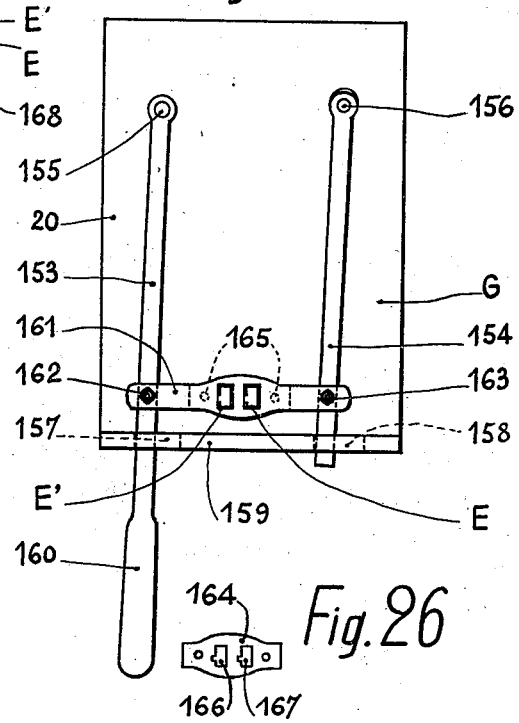
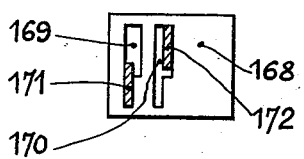
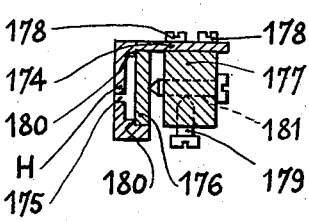
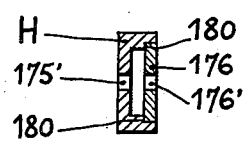
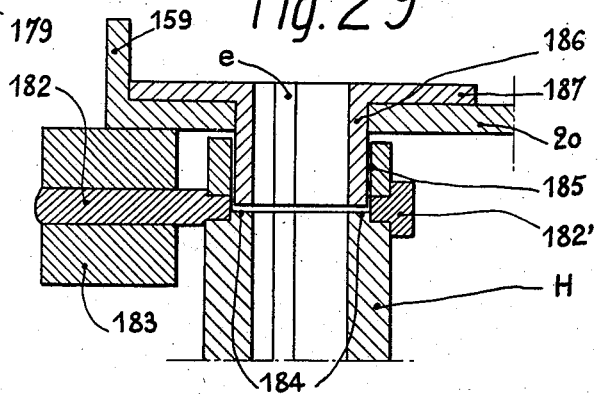
Inventor:
Lucien Marcel Schune Dec. 10, 1935.     L. M. SCHUNE     2,023,648
MACHINE FOR MANUFACTURING ZIP FASTENERS
Filed June 21, 1933     16 Sheets-Sheet 12
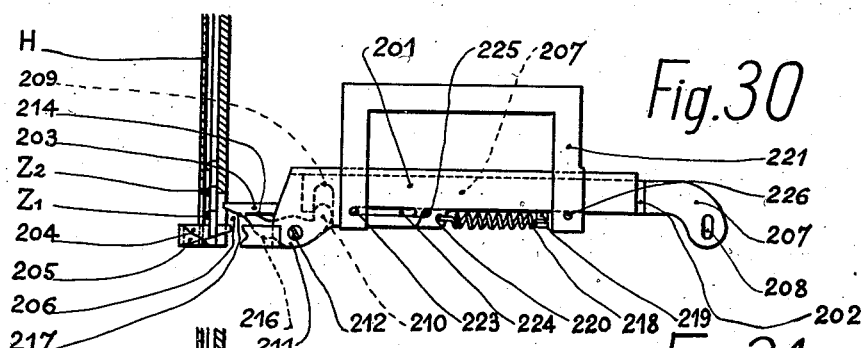
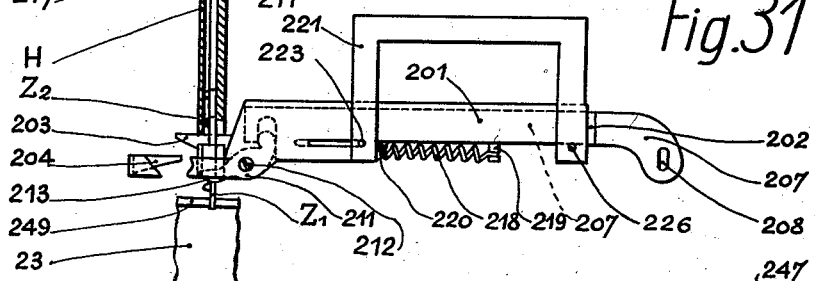
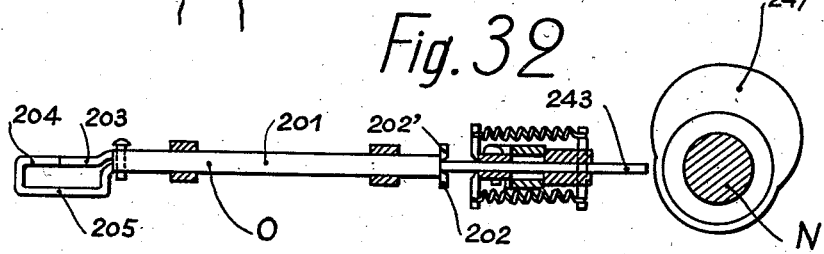
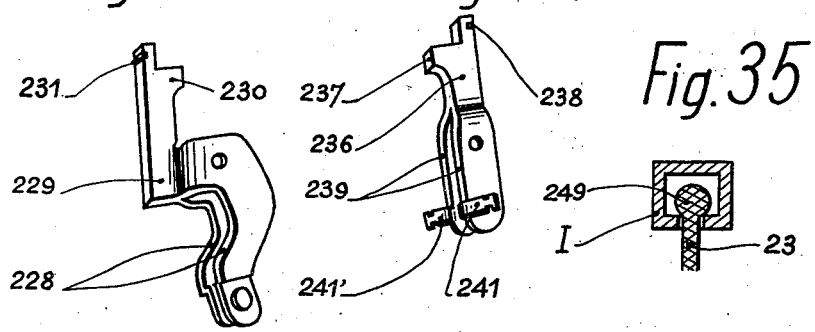
Inventor:
Lucien Marcel Schune Dec. 10, 1935. L. M. SCHUNE 2,023,648
MACHINE FOR MANUFACTURING ZIP FASTENERS
Filed June 21, 1933 16 Sheets-Sheet 13
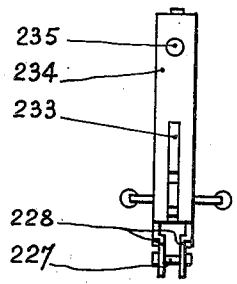
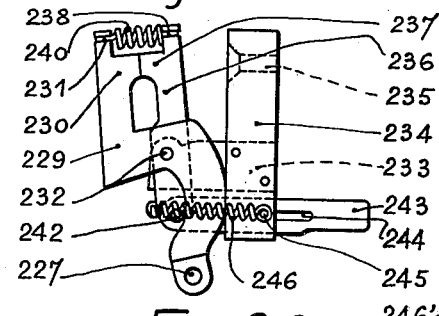
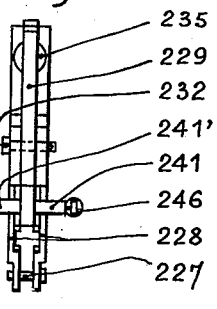
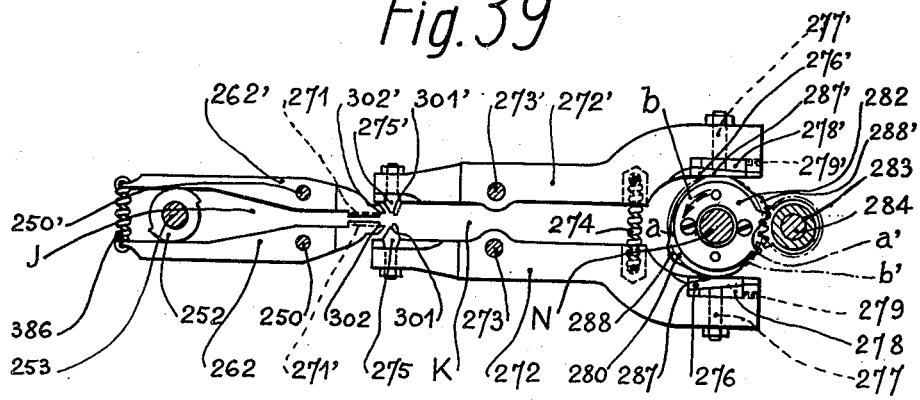
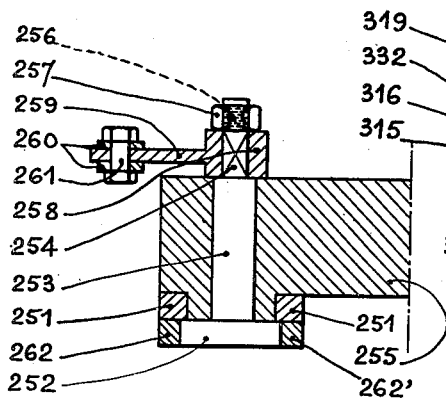
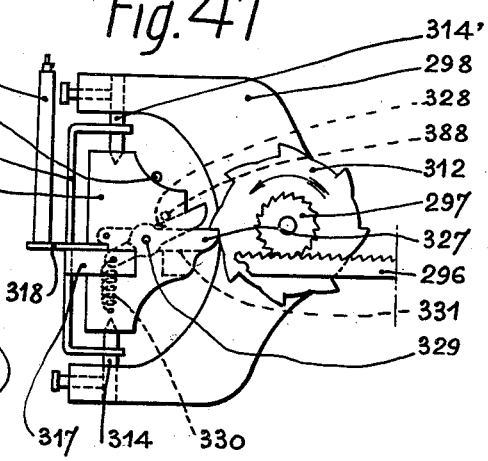
Inventor:
Lucien Marcel Schune Dec. 10, 1935.  L. M. SCHUNE  2,023,648
MACHINE FOR MANUFACTURING ZIP FASTENERS
Filed June 21, 1933  16 Sheets-Sheet 14

Inventor:
Lucien Marcel Schune

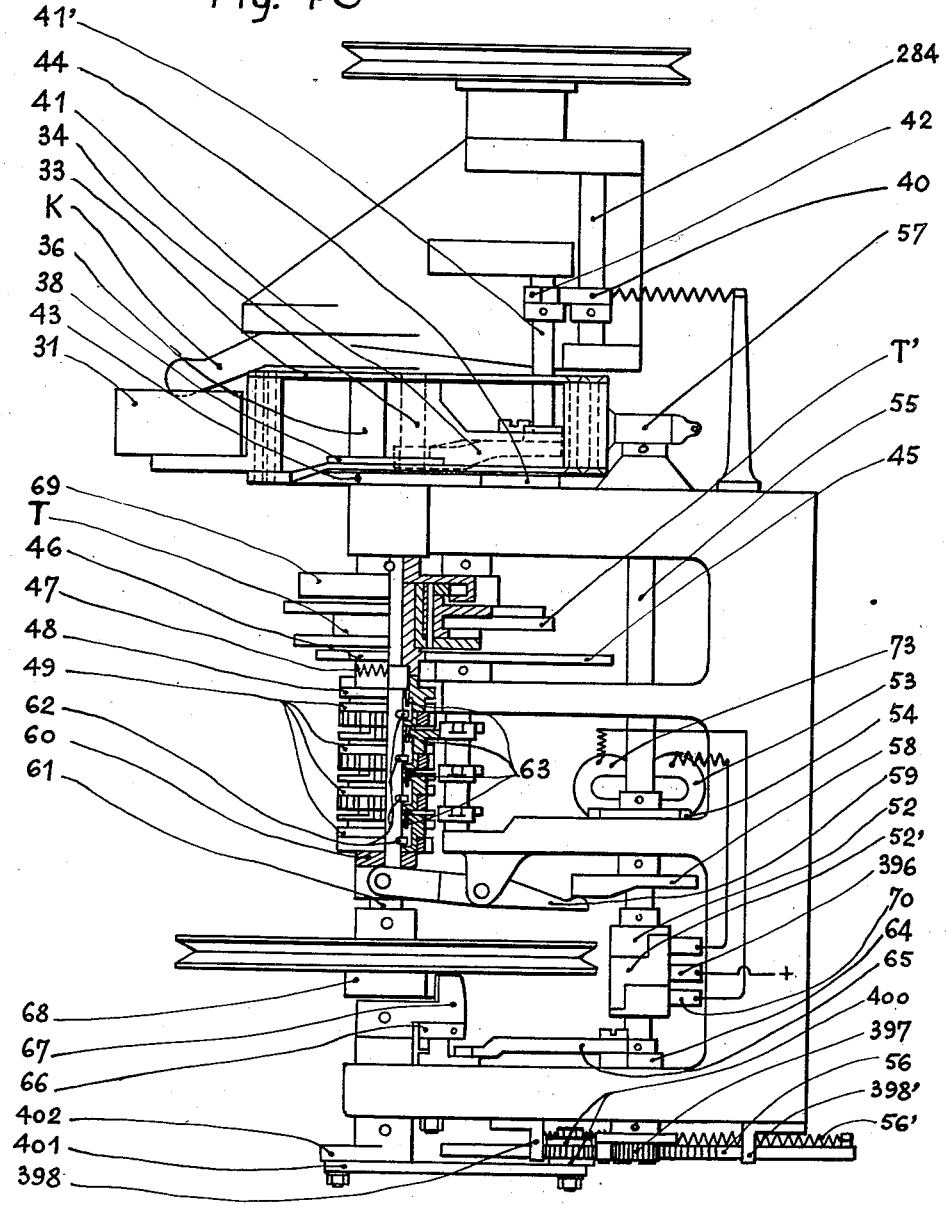

Dec. 10, 1935.　　　L. M. SCHUNE　　　2,023,648
MACHINE FOR MANUFACTURING ZIP FASTENERS
Filed June 21, 1933　　16 Sheets-Sheet 16
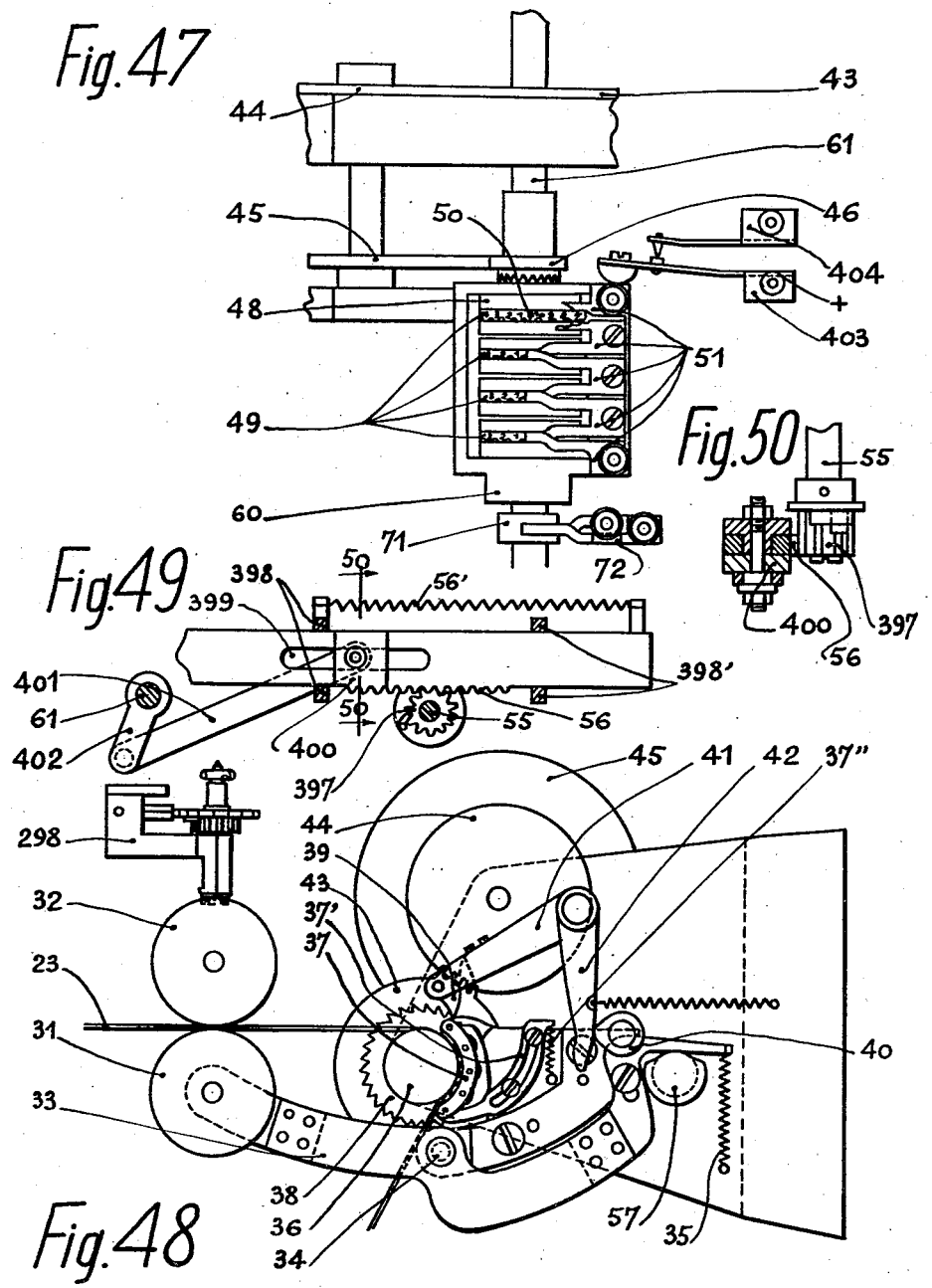
Inventor:
Lucien Marcel Schune Patented Dec. 10, 1935

2,023,648

UNITED STATES PATENT OFFICE 2,023,648

MACHINE FOR MANUFACTURING ZIP FASTENERS

Lucien Marcel Schune, St. Maur des Fosses, France

Application June 21, 1933, Serial No. 677,094 In France June 23, 1932

7 Claims. (Cl. 153—1)

The present invention relates to a sorting and setting machine for the manufacture of flexible metallic fasteners.

Flexible metallic fasteners, or zip fasteners, consist of two flexible bands generally of fabric, in which are set male and female hooks, respectively, which, by interlocking, serve to connect together the two bands that form the fastener.

The machines for the manufacture of such fasteners consist of the combination of two parts, one called the sorting machine which receives in bulk the hooks cut and stamped, separates them from one another and after having placed them in a suitable position, conveys them automatically to the second part called the setting machine. This second part guides and holds the flexible band, takes the hooks, disposes them on the band, and sets them thereon.

The hooks employed in machines of this kind comprise two flat branches and a boss projecting on one side of the hook with respect to said branches.

The essential feature of the present invention consists in providing a sorting device adapted to feed the hooks in suitable position to the clipping mechanism whatever be the relative position of said hooks when initially presented to said sorting and feeding device, that is to say whether their boss is turned on one side or on the opposite one.

This machine is further remarkable in that its setting portion comprises automatic means for periodically driving and stopping the flexible band synchronously with the movement of the clipping tool, automatic and adjustable means ensuring the stopping and the starting of the setting portion of the machine, so as to obtain bands having portions provided with hooks clipped thereon of determined lengths separated by intervals without hooks also of determined length.

Other features of the present invention will result from the following detailed description of some specific detailed embodiments thereof.

Preferred embodiments of the present invention will be hereinafter described with reference to the accompanying drawings given merely by way of example, and in which:

Figs. 1 and 2 are an elevational view and a side view respectively of a hook of the usual type;

Fig. 3 is a side view of the sorting and setting machine according to the invention;

Fig. 5 is a front view thereof;

Fig. 6 is a plane view thereof;

Fig. 7 is a perspective view of the rotary distributing member, one of the walls thereof being cut away;

Fig. 8 is a diagrammatical view showing the disposition of the hooks in a chute having an eccentric groove or slot;

Fig. 9 is a diagrammatical view showing the disposition of the hooks in a chute having an axial groove or slot;

Figs. 10 and 11 are an elevational view and a side view respectively of the lever that supports the hook while the sorting operation is taking place in the eliminator;

Figs. 12 and 13 are an elevational view and a side view respectively of the ejecting lever of the eliminator;

Figs. 14 and 15 are cross sectional views showing a hook in the round position, respectively before and after its being ejected;

Figs. 16 and 17 are an elevational view, and a sectional view on the line A—A of Fig. 16 of a stopping shutter of the eliminator;

Fig. 18 is a perspective view showing the lever that controls the automatic stopping at the end of the filling;

Fig. 19 illustrates the operation of the automatic stopping device when a single hook passes under one of noses of the oscillating member;

Fig. 20 shows the operation of this device when the column of hooks is complete and each nose of the oscillating member is blocked by a hook;

Figs. 21A, 21B and 21C are three complementary portions of an elevational view of the lower part of the machine, which serves to set the hooks;

Fig. 22 is a sectional view on the line 22—22 of Fig. 21B;

Fig. 23 is a sectional view on the line 23—23 of Fig. 21B; showing the feed stopping device;

Fig. 24 is a sectional view on the line 24—24 of Fig. 23, showing the position of the stop levers in the notches;

Fig. 25 is a sectional view on the line 25—25 of Fig. 21B;

Fig. 26 is a plane view of the protecting plate;

Fig. 27 is a sectional view of the central feed chute on the line 27—27 of Fig. 22;

Fig. 28 is a sectional view on the line 28—28 of Fig. 22;

Fig. 29 is a sectional view on a larger scale of the upper part of the feed chute;

Fig. 30 is an elevational view, on a larger scale of the distributor with its member for pushing the pieces at the start of its forward movement;

Fig. 31 is a similar view at the end of the forward movement of the distributor;

Fig. 32 is a plane view showing the distributor with its control cam;

Figs. 33 and 34 are perspective views of the two oscillating levers with elastic connection that transmit the feed movement to the distributor;

Fig. 35 is a sectional view on the line 35—35 of Fig. 21A, showing the cross section of the guide for the flexible band;

Fig. 36 is an elevational view showing the device for transmitting the feed movement to the distributor;

Fig. 37 is a corresponding side view;

Fig. 38 is a corresponding side view seen from the other side;

Fig. 39 is a plane view showing the tool for grasping the fabric and the clipping tool, with their driving organs;

Fig. 40 is a sectional view on the line 40—40 of Fig. 21A showing the device for controlling the cam that actuates the tool for grasping the fabric;

Fig. 41 is an elevational view of the escapement block;

Fig. 46 is a front elevational view of the device for automatically stopping the clipping of the hooks;

Fig. 47 is a partial elevational view at right angles to the preceding one;

Fig. 48 is a corresponding plane view;

Fig. 49 is a plane view on a larger scale, showing the device for controlling the anchor escapement;

Fig. 50 is a sectional view on a larger scale, on the line 50—50 of Fig. 49;

Fig. 51 is an elevational view of another embodiment of the automatic stop control lever, with the addition of a retarded relay.

Figure 4:
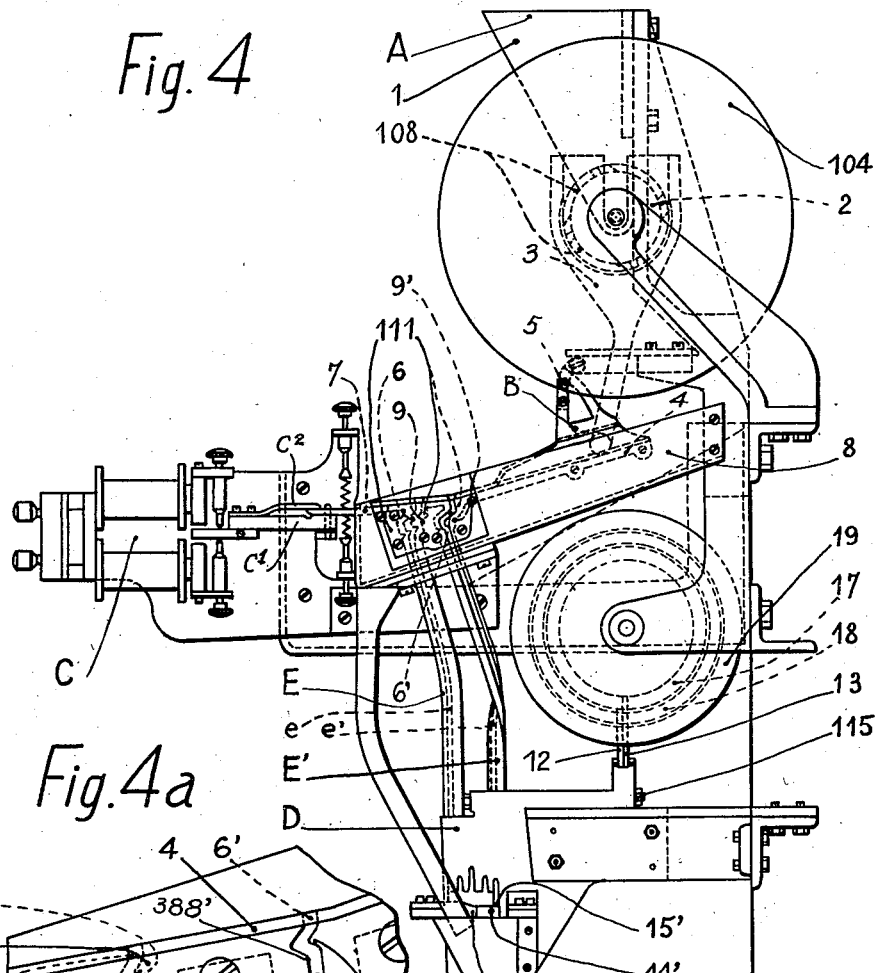
Fig. 4 is a side view on an enlarged scale, of the upper portion, or sorting portion of the machine.

The sorting and setting machine for the manufacture of flexible metallic fasteners, or zip fasteners, shown in the accompanying drawings essentially comprises two portions supported by a common frame:

(1) The sorter which is fed with hooks in bulk, and mixed together; this portion of the machine sorts the hooks, arranges them, distributes them and automatically prepares them for their positioning and clipping on the fabric.

(2) The setter which automatically places the hooks coming from the sorter on the fabric and clips them thereon; this portion of the machine also comprises devices permitting to regulate the feed of the hooks and their clipping on the fabric according to the length of the zip fastener that it is desired to obtain.

Each of these portions of the machine comprises a certain number of organs performing the operations hereinafter described.

1. The sorter comprises:

(a) A separator A which receives hooks in bulk and serves to distribute them;

(b) A sorting device B which sorts them in the vertical direction and in the lateral direction;

(c) A vibrating device C actuating the sorting device and conveying the hooks by gravity toward the feed tubes E, E';

(d) An eliminator D which casts out the hooks that are in the wrong direction;

(e) An automatic stopping device F;

(f) A device G permitting to place either of the feed tubes into communication with a central chute H;

(g) A central chute H for feeding the clipping portion of the machine;

(h) A decohering hammer m.

2. The clipping portion of the machine comprises:

(a) A horizontal guiding chute I for the flexible band;

(b) A distributor O for distributing the hooks along the fabric;

(c) A pair of tongs J maintaining the fabric in the position for receiving the hooks;

(d) A clipping tool K having two branches for placing the hooks on the edge of the fabric and clipping them in position;

(e) A semi-automatic device L for moving the fabric;

(f) An automatic device for stopping the clipping tool;

(g) An automatic device for driving the flexible band, adjusting its length, pulling the dead end and starting the operation.

Each of the organs that go to make these two portions of the machine will be studied separately, and its operation will be explained at the same time as that of the pieces with which it cooperates.

The hook Z shown in an elevational view and a side view respectively in Figs. 1 and 2 is of the type generally utilized for the manufacture of flexible metallic fasteners. It comprises a boss or hook Z on one of its faces, a hollow Z' of corresponding size in the opposite face, and two branches Z'' for clipping on to the fabric.

1. SORTER (a) *Separator*

The separator A (Figs. 4, 4a, 5, 6 and 7) consists of a hopper 1 of suitable shape into the bottom of which opens the splayed end 101 of a conical member 102 rigidly fixed to the lid 103 of dividing member 2. This frusto-conical dividing member 2 which is actuated through pulley 104 is provided with an inner drum 105 rigidly fixed to lid 103 and through which passes conical member 102. The outer periphery of said dividing member is provided with a certain number of openings 106, four in the present case, placed close to lid 103. The latter is provided on its inner face with four small blades 108 carried by brackets 107 which form together a discontinuous ring parallel to the lid, the width of which corresponds to the interval between the cylindrical wall of drum 105 and the inner wall of frusto-conical member 2, the outer edge of said blades passing close to said wall of member 2. A free space 109 is provided between two adjacent blades 108. These blades form together with the periphery of drum 105, the inner wall of member 2 and lid 103, compartments opening into spaces 109, and the bottom of which, consisting of portion 110 of brackets 107, is located substantially opposite the openings 106 provided in the wall of frusto-conical member 2.

These openings 106 are located opposite a hopper 3, the lower end of which opens over the sorter.

The hooks poured in bulk in hopper 1 are caused to enter, owing to the rotation of member 2 and of the shape of the end 101, into a conical element 102 from which they slide by gravity into dividing member 2. Owing to the frusto-conical shape of this member 2, the hooks slide towards the left hand side thereof (Fig. 7). They are then caught by small blades 108 which cause them to penetrate into the corresponding compartments at the bottom of which are located openings 106. The hooks drop regularly through said openings into hopper 3 which conveys them to the sorter. It should be noted that dividing member 2 might be replaced by an organ that would play the same part, for instance a shaking hopper.

(b) *Sorter*

The sorter B (Figs. 4, 4a, 5 and 6) consists of two guiding members 4 and 4' connected with inclined walls 113 forming a kind of hopper. These guiding members are held together by cross pieces 111 so as to leave between them a space 112 forming a slide and of carefully calculated width. These guiding members are further provided wtih notches 6, 6' (Fig. 6) of suitable shape and the size of which corresponds to that of the boss $z$ of hooks Z. These guiding members are disposed inside an inclined box 8 for receiving hooks that are rejected. An opening 7 provided at the end of the slide connects the latter with said box 8, the lower end of which is connected with an outlet tube 10 for said hooks.

Figure 4A:
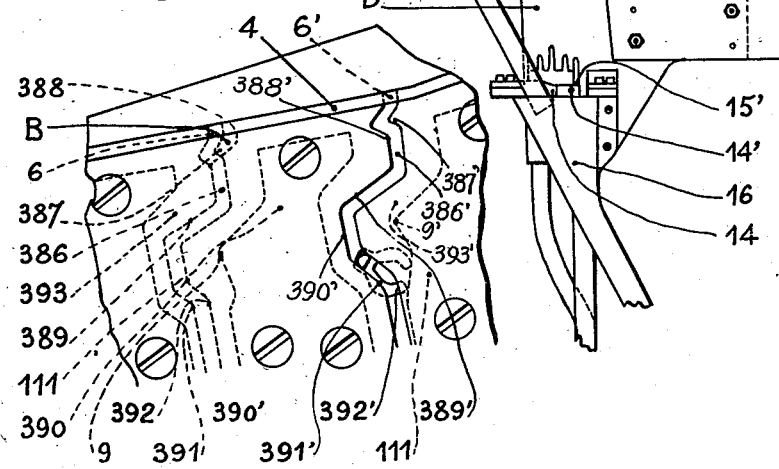
Fig. 4a is an enlarged side view showing the chutes of the sorter with their bends for straightening the position of the hooks.

This sorter can oscillate at its rear part about two screws 5, and at its front part it is connected to the vibrating device C. Opposite notches 6 and 6' (Fig. 4a) there are disposed grooves 386, 386' supplying a passage for bosses $z$. These grooves comprise a sudden bend 387, 387' respectively, then a substantially vertical part 388, 388', and a part moderately inclined 389, 389'. This inclined part is followed by a substantially vertical part 390, 390' leading to the straightening bend 391, 391', and finally the last portion 392, 392' which is substantially vertical. Spacing members 111 are cut as shown in Figs. 4 and 4a, and are so arranged as to leave between their edges a chute 393, 393' the bend 9, 9' of which is intended to cooperate with the straightening bends 391, 391' of the guide groove 386, 386' corresponding to boss $z$ of the hooks, these chutes 393, 393' leading to the feed chutes E, E'. The latter are flat and have a width and a thickness that are so calculated as to correspond to a good piling and to a proper guiding of the hooks. They comprise a longitudinal groove $e$, $e'$ which is not located axially, provided in one of the large walls of the chutes and registering with grooves 386, 386' of the sorter. Each of these grooves is intended to receive the boss $z$ of hooks Z, and it is of sufficient size for ensuring the perfect guiding of said hooks.

(c) *Vibrating device*

The vibrating device C (Figs. 4, 5 and 6) of a known type per se, consists of a polarized magnetic relay, the principle of which is analogous to that of some systems of electric bells.

Besides, it should be noted that this specific vibrating device can be replaced by any other equivalent device, for instance of a purely mechanical or pneumatic type.

The ends of guiding members 4 and 4' are engaged, as more clearly shown by Fig. 4, between the vibrating member $C^1$ of vibrating device C and a flat spring $C^2$ fixed to said vibrating member $C^1$ so that the vibratory movement of member $C^1$ is imparted to said guiding members 4 and 4' which oscillate about screws 5, thus urging the hooks that issue from hopper 3 towards the lower portion of the slide. These hooks, due to the inclination of walls 113, have their branches engaged into slide 112 where they hook by their boss or hook $z$ which prevents them from dropping between guiding members 4, 4'. These hooks are therefore engaged into a groove 112, along which they slide toward the front of the machine, the boss of each of them being turned either on the right hand side or on the left hand side. The hooks, the bosses of which are located on the left hand side come opposite notch 6' and move downwardly therethrough, while the others slide as far as notch 6 through which they are moved down already.

The hooks that are not of standard shape (having for instance too large or too small bosses) and also those that are not properly brought opposite notches 6, 6', fall into box 8 from which they slide into a tube 10 leading to a receptacle that is not shown in the drawings. This is due to the fact that the hooks that have bosses larger than the standard size cannot engage into openings 6, 6' and therefore further move along guiding surfaces 4, 4' until they reach an opening 7 located directly above the inlet of tube 10. As for the hooks that have bosses smaller than the standard size, they slip between guiding surfaces 4 and 4' before they can reach openings 6, 6', drop onto the inclined bottom of box 8 and slide along said bottom into tube 10. The hooks thus removed are again circulated through the machine until there remains only the hooks that are absolutely impossible to use.

The bosses of the hooks that have passed through each of the notches 6, 6' meet the sharp bend 387, 387' which has for its effect to impart a slight shock to them, in order to bring them, as far as possible, into the vertical position. Furthermore, the presence of the projection corresponding to points 387, 387' serves to guide the branches of the hooks having their bosses located on the side opposite to the notch that is considered, so as to oppose a partial penetration of these hooks into said notch, which would result in stopping the feed. The hooks still guided by the sliding of their bosses owing to the vertical portion 388, 388', quickly clear this part of the sorter so as to leave a free passage for the following hooks; they then move along slightly inclined portions 389, 389' which allows them, as well through the effect of gravity as under the action of the vibrations imparted by the vibrating device, to assume a substantially vertical position with their branches downwardly directed. The substantially vertical part 390, 390' accelerates their speed.

When a hook is in a substantially vertical position, its branches being directed either upwardly or downwardly, it passes through the straightening bends without being influenced thereby, and penetrates normally into the feed tubes E, E'. If the hook is inclined, resting through its boss upon the straightening bends 391, 391' and through the ends of its branches upon the straightening bends 9 and 9' of spacing members 111, it pivots about its boss until the end of the branches is located opposite the vertical portion of chutes 393, 393' which is prolonged by feed chutes E, E'. The hook therefore enters the latter in a vertical position, the branches being directed downwardly.

The feed chutes E, E' receive the hooks issued from the sorter, the boss z of said hooks entering the groove e, e' of the corresponding chute. The groove e, e' of this chute is located on the one side of the medium line of the wall in which it is provided. This arrangement (Fig. 8) gives the hooks an inclination that permits a proper guiding of the hooks without any possible jamming.

On the contrary, the arrangement of grooves located along the axis of one of the walls of the chute, has the disadvantage of producing frequent jamming (Fig. 9) due to the fact that the hooks engage into one another.

The hooks therefore move in said tubes under the action of gravity. They are disposed (Fig. 8) in such manner that their branches are located either upwardly or downwardly and are guided by the sliding of their bosses in groove e or e'. One of the feed chutes E' on the drawings, is twisted by half a turn so that when they arrive to eliminator D, all the hooks have their bosses located in the same side.

*(d) Eliminator*

The eliminator D (Figs. 4, 5, 10, 11, 12, 13, 14, 15, 16 and 17) comprises essentially two levers 12 and 13 urged by springs 116, 116' and oscillating about a spindle 115 integral with frame 11 and controlled by a set of cams 17 and 18 provided on a wheel 19 driven by the engine that drives the sorting portion of the machine. Lever 12 (Figs. 10 and 11) has its upper end 117 applied against cam 18 by a spring 116 fastened on the one hand to frame 11, and on the other hand to a projection 12' of lever 12. The other end of lever 12 carries two punchers 118, 118' suitably spaced from each other. Lever 12 also carries above punchers 118, 118' elastic braking pieces 114, 114' which penetrate in the grooves e, e' of chutes E, E' and thus prevent hooks Z from bouncing back from punchers 118, 118'. At the lower part of lever 12 there is provided a fork 12'' intended to carry the lever of the automatic stopping device F which will be hereinafter described in detail. Lever 13 (Figs. 12 and 13) subjected to the action of a spring 116', fastened at one of its ends to frame 11, and at the other end to projection 13' of lever 13. The upper end 119 of said lever is in contact with cam 17. This lever comprises at its lower part two sets of punchers 120, 120' and 121, 121'. The latter punchers 121, 121' which are of circular shape, slide in corresponding channels 122, 122' of corresponding cross section and having the shape of circular arcs having their centres on the geometric axis of spindle 115. These punchers 121, 121' are acted upon by springs 123, 123' disposed in channels 122, 122'. Lever 13 carries, by means of two screws 124, a return piece 125 (shown in Figs. 5, 14 and 15) the function of which will be hereinafter explained.

Each feed chute E, E' is provided, in its wall opposite to the one in which is provided groove e, e', and opposite punchers 118, 120 of levers 12 and 13, with an aperture 14, 14' closed by a shutter 15, 15' integral with two side plates 126 provided with a nose 127 and adapted to oscillate about a pin 133 (Figs. 16 and 17). Each of these shutters 15, 15' is provided with an aperture 132, 132' located opposite puncher 120, 120' respectively. Two springs 128, 128', fixed at 131, 131' to frame 11, each have a curved portion 129 terminated by a tail 130. Each of these springs acts on the corresponding nose 127 of shutter 15 or 15' either through its curved part 129 or through its tail 130.

A receptacle 16 is located behind apertures 14 and 14' and receives the hooks that are eliminated. The operation of eliminator D is as follows:

Lever 12, controlled by cam 18, being in the position shown in Figs. 14 and 15, supports through its punchers 118, 118' each of the columns of hooks to be sorted disposed respectively in feed chutes E, E'. These punchers 118, 118' can support the pile of hooks either through one of the branches of the last hook Z bearing against one of said punchers, if said last hook Z is in the correct position, (owing to the fact that the guide groove e, e' of chutes E, E' is not disposed axially) or through the head of the last hook resting on the corresponding punch if the latter is disposed head downwards as shown in the drawings.

This hook Z (Fig. 14) is located opposite aperture 14 or 14', which is closed by shutter 15 or 15'.

Lever 13 which is actuated by cam 17 now oscillates towards the right hand side about spindle 115, driving together with it return member 125. In the course of this movement, punchers 121, 121' which normally project beyond punchers 120, 120', stop the hook located immediately above the hook Z that is considered, either by engaging between the branches of said hook Z as shown in Figs. 14 and 15 if this hook is in the correct position, or by supporting its head. As lever 13 further moves, punch 121, 121', which butts against the wall of chute E, E' compresses spring 123, 123', thus allowing punch 120, 120' to move further. If hook Z is in the correct position, the punch penetrates between the two branches without coming into contact with the hook, and passes through aperture 132 provided in shutter 15, 15'. If on the contrary, hook Z is positioned head downwards (Fig. 14), the end of punch 120, 120' butts against the boss z of the hook, and, through it, causes shutter 15, 15', which oscillates about spindle 133, to swing back. This movement being started, the nose 127 of side plates 126, which up to now was applied against the curved part 129 of spring 128 is now in contact with the tail 130 of the latter which causes its movement to be completed, thus permitting hook Z to fall into receptacle 16. Lever 13 now oscillates in the opposite direction, driving together with it return member 125 which brings shutter 15, 15' into its initial position in which it is maintained by the curved part 129 of spring 128. The punch 120, 120' has now wholly cleared chute E, E' and punch 121, 121' pushed by spring 123 is still in contact with the wall of the chute. Lever 13 then remains stationary and lever 12 now oscillates towards the rear, thus removing punch 118, 118' from the path of travel of the hooks, which allows hook Z to pass to the lower part of the feed chute, provided of course that said hook was in the correct position and has not been ejected by punchers 120, 120'. Lever 12 again oscillates towards the front in the direction of the chutes and engages groove e, e'. Then lever 13 further oscillates towards the rear together with punch 121, 121', which releases the column of hooks. The operation above described is then again repeated.

It should be noted that punchers 118, 118' and 120, 120' might also be elastically mounted so that they may yield, thus avoiding any risk of injuring the mechanism in case of accidental stoppage of the apparatus.

5 *(e) Automatic stopping of the feed mechanism*

The feed mechanism automatic stopping device F (Figs. 5, 18, 19 and 20) consists essentially of a lever 134 in the form of a plate, the front part of which is curved and bent so as to form a fork 135 provided with holes 136 for a spindle 137 carried by the fork 12'' of lever 12 (Fig. 5). The two walls of this fork 135 are prolonged by side plates 141, 141' provided at their bottom with bent parts 142, 142' on which are fixed springs 143, 143' by means of screws 149, 149' respectively. These springs press through their upper ends against the bent edge 139 of a piece 138 provided with two noses 138', 138'' and oscillating about a spindle 140 rigidly carried by the corresponding side plate 141. The interval between side plates 141, 141' is such that noses 138' and 138'' are located opposite grooves e, e' located in the feed chutes E, E'. Said feed chutes are also provided, in their walls opposite to those that are provided with grooves e, e', with openings e1, e'1 of corresponding width and adapted to permit noses 138' and 138'' of oscillating pieces 138 to pass through them. In a likewise manner, the distance between the two noses 138', 138'' of the oscillating piece 138, corresponds to the distance between the bosses of two adjacent hooks of a column of hooks. The oscillation of lever 134 in the downward direction is limited by a stirrup 148 rigidly fixed to lever 12 by screws 152. The oscillation of lever 134 in the opposite direction, that is to say upwardly, produces an upward movement of a piston 144 made of an insulating material. This piston slides inside a plunger 151 made of a conducting material. A spiral spring 145 is interposed between piston 144 and plunger 151; this spring tending to apply piston 144 against lever 134. Plunger 151 slides in a socket also made of a conducting material connected with a current inlet terminal 146, and it comes, at the end of its upward stroke, into contact with the end of a curved outlet terminal 147. The whole is located within a block 150 made of an insulating material and rigidly fixed to lever 12. These terminals 146, 147 are inserted in the electric circuit of an automatic relay of any conventional type (not shown in the drawings) adapted to control the motor through which the whole mechanism above described is actuated. This relay is so arranged that when its circuit is closed by plunger 151 coming into contact with terminal 147, it causes said motor to stop.

When lever 12 is in its rear position, the oscillating piece 138 is kept in position by the pressure exerted by the upper end of spring 143 against the bent edge 139 of said piece 138. When lever 12 reaches its extreme front position, either of the two following cases may occur:

(a) The feed chute E, E' corresponding to the oscillating piece 138 that is considered is not full (Fig. 19). In this case only one of the noses, nose 138'' in the drawings, butts against the boss z of a hook Z. Piece 138 then pivots about its spindle 140, thus deforming spring 143 without modifying the position of side plates 141, 141'.

(b) The feed chute E, E' corresponding to the oscillating piece that is considered is full (Fig. 20). In this case both of the noses 138', 138'' of piece 138 butt against the bosses z1, z2 of two adjacent hooks $Z^1$, $Z^2$, and piece 138 cannot oscillate about spindle 140. Under these conditions, lever 135 oscillates about spindle 137 carried by fork 12'' of lever 12 and plate 134 lifts piston 144 which by compressing spring 145, brings plunger 151 into contact with terminal 147. The electric circuit of the automatic stop relay above referred to is therefore closed, which causes the stopping of the whole system: separator, sorter and eliminator.

*(f) Device for feeding hooks to the central chute that feeds the clipping portion of the machine*

The device G for feeding clips to the central chute H that feeds the clipping portion of the machine (Figs. 21, 22, 23, 24, 25 and 26) consists essentially of two levers 153, 154 adapted to oscillate respectively about pivots 155, 156 mounted on a plate 20 integral with the frame, and connected together by a cross member 161 jointed to said levers at 162 and 163 so as to form a jointed parallelogram. The end of lever 153 that is opposed to its pivoted end 155 forms an operating handle 160. This lever and also lever 154 are adapted to move in two apertures 157 and 158 respectively, provided in a portion 159 of plate 20, so as to limit the deformation of the jointed parallelogram. Cross member 161 receives the end of each of the feed tubes E, E' (Fig. 25) which are flush with the under face of cross member 161. On this under face of said cross member 161 there is fixed, for instance by means of a screw 165, a plate 164 made of a resistance metal, such as steel provided with two holes 166, 167, the cross section of which coincides accurately with the inner cross section of tubes E, E' including the grooves e, e'.

Plate 20 also carries a casing 168 provided with two slots 169 and 170, the lower end of which is of restricted width (Fig. 24). On the rear part of casing 168 two elastic levers 171, 172 consisting for instance of two flat springs are pivoted about the axis of a screw 173. These spring levers are urged by their elasticity against the right hand edge of their respective slots 169, 170. Each of these levers carries a lug 171', 172' the width of which is smaller than that of grooves e, e'. According as the lever will occupy the upper or the lower portion of the corresponding slot, the lug of said lever will be located either opposite the corresponding groove of the feed chute or in said groove. In said second position, it will stop the downward movement of the column of hooks in the corresponding feed chute.

In Figs. 23 and 24, lever 172 occupies a position such that its lug 172' entering into groove e of chute E, stops the column of hooks in this chute. The central chute H is therefore fed through tube E' which is directly connected with said central chute. In order to feed the central chute with hooks coming from tube E, it is first necessary to stop the column of hooks moving downwardly through tube E'. For this purpose it suffices to move lever 171 upwardly in slot 169. Due to its elasticity this lever is applied against the right hand edge of this slot and lug 171' stops the column of hooks moving downwardly through chute E' due to the fact that said lug engages groove e'. It then suffices, by acting on lever 160 to bring the jointed parallelogram into the position shown in Fig. 25 so that chute E may come opposite the central chute H. The width of apertures 157, 158 provided in the flange 159 of plate 20 is calculated in such manner that the two extreme positions of the levers correspond to an accurate registering of one of the chutes E, E' with the central chute H. Lever 172 is then brought into the narrow lower portion of slot 170, and its lug 172' leaves groove e and releases the column of hooks that was stationary in this chute. The reverse operation permits to bring feed chute E' into coincidence with central chute H.

The object of plate 164, which is made of a resistant metal is to prevent deformation of the extremities of tubes E, E' in case of an error in the manipulation of the machine. As a matter of fact, it might happen that the operator passes from one position of lever 160 to the other position without stopping the downward movement of the column of hooks. In this case, if, when the jointed parallelogram is displaced, a hook happened to be partly engaged in the central chute, the effort transmitted by said hook on the end of the corresponding feed chute would result in deforming the latter, which is made of a not very strong metal and in deteriorating it. Plate 164, owing to the strength of the metal of which it is made, can withstand this effort without any inconvenience, and the operator is warned that he is making a mistake by the resistance that he meets with and can easily remedy this error.

(g) Central feed chute

The central feed chute H (Figs. 21, 22, 27, 28 and 29) consists essentially of a body H comprising a portion 174 at right angle thereto on which is fixed, by a screw 178, a block 177 through which extend screws 181 which apply a longitudinal closing plate 176 against surfaces 180 provided in the body of the central chute. Fixing screws 179 keep screws 181 in position. The face of chute H located opposite plate 176 is provided with a groove 175 which terminates at its lower end by an aperture 175' extending throughout said face. Plate 176 is also provided, at its lower end with an aperture 176', of about the same height.

The cross section of the chute thus constituted is identical to the cross section of one of the feed tubes E, E'.

The central chute H is connected to the frame 183 of the machine through spindles 182, 182' located in line with each other (Fig. 29). The upper portion of chute H forms a socket 185 in which is engaged a stationary sleeve 186 fixed to plate 20 through a plane attachment 187. The cross section of said sleeve 186 is also identical with the cross section of one of the feed chutes E, E'. The planes of the adjacent surfaces at 184, which have a very small space between them, are located in the immediate vicinity of the horizontal plane containing the geometrical axis of articulation 182, 182', so that there does not exist between the stationary part and the movable part of the central chute any interval permitting a hook to leave the chute when the latter oscillates accidentally.

At the lower end, the lateral faces of the central chute comprise two parallel inclined surfaces 188, 189 which serve to center aperture 175' in the corresponding face, so that the plane of symmetry of the hooks, when they leave the central chute, may be in the vertical position.

Accidental oscillatory movements of the central chute, the chief causes of which will be hereinafter explained, are limited by a spring 199 fixed to the frame and which brings back chute H into the desired position. This position is fixed by means of an adjustable stop 200.

(h) Decoherer hammer

The decoherer hammer m (Fig. 21) is carried by a bent lever 190 oscillating about a spindle 191 carried by a bracket 192 integral with the frame of the machine. This bracket 192 is provided with a tail 193 to which is fixed one of the ends of a spring 196 the other end of which is fixed to a point 195 of bent lever 190. The latter is also provided with a nose 194 adapted to cooperate with an inclined surface 197 acting as a cam and driven by main shaft N. This cam 197 lifts, for each revolution of shaft N, the hammer which, urged by spring 196, strikes the lower part of central chute H and causes the hooks that might remain wedged in said chute to drop.

The oscillatory movement of bent lever 190 is limited by a part 198 applied against bracket 192.

2. CLIPPING PORTION OF THE MACHINE

(a) Guide piece for the flexible band

The guide piece I for the flexible band (Figs. 21 and 35) is intended to receive the rounded edge 249 of flexible band 23 which is intended to receive the hooks to be clipped. This tube I is only intended to maintain the fabric at the suitable level for the clipping of the hooks thereon.

(b) Distributor

The distributor O (Figs. 21, 22, 30, 31, 32, 33, 34, 36, 37 and 38) consists of a piece 201 the cross section of which is of the shape of an inverted U. At one of its ends this piece 201 is provided with two lugs 202, 202' forming stops. At the other end of said piece 201, one of the sides thereof forms a point-shaped projection 203 the under edge 217 of which is inclined. The other side of said piece 201, also forms a projection 205 located at a level lower than that of projection 203 and bent twice so that its end 204 extends in a direction opposite to that of projection 203. As shown in Figs. 30 and 32, these two point-shaped projections 203, 204, are disposed one above the other, a certain free space 206 being left between them.

Inside piece 201 is slidably mounted a lever 207 the slightly bent end of which is provided with an eye 208 and the other end of which is provided with a vertical notch 209. The rounded tail 210 of a lever 211 oscillating about a pin 212 carried by piece 201 fits in said notch 209. The other end of said lever 211 forms a nose 213 which, in the position shown in Fig. 30, engages a recess 214 provided in the under edge of projection 203 and the lower portion 216 of which is located in line with the inclined under surface 217 of projection 203. A spring 218, fixed at one end to a projection 219 of piece 201 and at the other end to sliding lever 207 at point 220 thereof, normally urges the latter toward the position shown in Fig. 30.

Piece 201 is guided by a support 221 which can be adjusted vertically by means of screws 222. A pin 223 rigidly connected to said support 221 extends through slots 224, 224' of piece 201 and through a slot 225 of lever 207. Said pin maintains the whole at the desired level. At the rear part of support 221 a pin 226 carries piece 201 and its sliding lever 207.

Said lever 207 is pivoted at its rear end about a spindle 227 carried by the fork shaped portion 228 of a lever 229 (Fig. 33) the upper end of which is provided with a stop 230 and a groove 231. Said lever is pivotally mounted about a pin 232 rigidly fixed to a piece 233 carried by a support 234. Said support is fixed in a suitable housing of the frame by means of a screw 235.

Pin 232 also carries an oscillating lever 236 provided at its upper part with a stop 237 and a groove 238. Oscillating lever 236 is also fork shaped at 239 so as to receive the end of piece 233 which engages inside the fork shaped portion 228 of lever 229. The two upper ends of levers 229 and 236 oscillate about axis 232 in the same way as the jaws of a pair of tongs and their closing movement is limited by the contact of the two stops 230 and 237. A spring 240 each of the ends of which is engaged in one of the grooves 231 and 238 respectively tends to bring said stops 230 and 237 against each other.

The lower end of fork shaped portion 239 is provided with lugs 241, 241' and supports a pin 242 extending throughout a piece 243 slidably mounted in support 234 and guided by a pin 245 which extends throughout its slot 244. Each of lugs 241, 241' is connected to the corresponding end of pin 245 by a spiral spring 246, 246' which normally maintains the whole of the oscillating levers in the position shown in Fig. 36.

The end of piece 243 slides in its support owing to its contact with cam 247 keyed on the main shaft N which is driven through wheel 248. The functions of distributor O are:

(1) To retain the hooks piled in central chute H inside said chute;
(2) To allow said hooks to move downwardly from said chute only one by one;
(3) To apply them against the flexible band;
(4) To keep them in position on said band during the clipping operation.

In the position of rest, the distributor O is as shown in Fig. 30 and is maintained in this position by spring 218 and also by springs 240 and 246. In this position the lower projection 204 of piece 201 is engaged in apertures 175' and 176' of central chute H and between the branches of the lowermost hook $Z^1$ of the column of hooks that is now occupying the central chute. The upper projection 203 of piece 201 is wholly on the outside of the central chute. As soon as cam 247 begins to act on the end of piece 243, it pushes the latter, which transmits its movement through the whole of oscillating levers 229 and 236 to the tail of lever 207. The latter, which is connected to piece 201 through spring 218 displaces the whole toward the left hand side. Projection 204 therefore moves toward the left hand side and projection 203 engages into apertures 175', 176' of central chute H. It therefore passes between the branches of the hook $Z^2$ located immediately above hook $Z^1$ and supports this hook $Z^2$.

It should be noted that the hooks, after passing through the sorting portion of the machine, are all correctly positioned, that is to say all have their branches directed downwardly. Therefore nothing opposes the movement of projection 203 between the branches of hook $Z^2$. However, in the very unlikely case in which a hook would be positioned head downwards, or would not move down completely, the end of projection 203 would come to butt against the boss of this hook and this might injure both the feed chute and the distributor. This is the reason for which the central feed chute is mounted in an oscillatory manner. In the case that has just been considered, said central feed chute would oscillate slightly about its pivots in order to allow the distributor to complete its movement without undergoing any injury. The distributor itself would therefore undergo no shock capable of deteriorating it because, due to the resistance met with, stops 230 and 237 would move apart from each other and spring 240 would absorb the shock. I have therefore provided a double safety device consisting of the oscillating mounting of the feed chute and of the play of the elastic organ that transmits to distributor O its forward movement.

As piece 201 further moves forward, projection 204 releases the hook $Z^1$ that it supported. Said hook falls normally, under the action of gravity. Its downward movement is accelerated by the contact of its upper part with the inclined surface 217 of projection 203, which is prolonged by the under edge 216 of lever 211. Hook $Z^1$ is therefore conveyed until it is located astride the round edge 249 of flexible band 23. Lugs 202, 202' of piece 201 butt then against the rear wall of support 221 and limit the forward movement of piece 201 and of point-shaped projections 203, 204. Lever 207 further moves and causes lever 211 to rotate about its axis 212; nose 213 during its downward movement strongly presses the upper part of hook $Z^1$ which it thoroughly engages on the rounded edge 249 of flexible band 23.

As cam 247 further rotates it progressively releases lever 207. During the first period of this movement piece 201 of the distributor remains stationary, being maintained in its position by spring 218. This has for its effect to bring the nose 213 of lever 211 back into its housing 214 provided at the lower part of projection 203. Then, the whole of the distributor moves back and projection 203 comes below hook $Z^2$ which it supports up to the time when it releases the latter, which under the action of gravity and of the shock of hammer m falls astride projection 204.

The whole has now come back to its initial position, and the cycle begins again.

(c) *Tongs for maintaining the fabric*

The tongs J (Figs. 21, 22, 39 and 40) consist of two symmetrical branches 262, 262' respectively pivoted about pivots 250, 250' rigidly carried by a supporting plate 251 (Figs. 21 and 40) fixed to the frame 255 by means of screws 270. The two rear ends of each of the branches 262, 262' are urged toward each other in the open position of the tongs by a spring 386. The two front ends of branches 262, 262' are each provided with a longitudinal groove 271, 271' (Figs. 22 and 39). When the two branches are brought into contact with each other, the grooves form a housing adapted to receive the rounded portion 249 of the flexible band. Furthermore, these ends of the branches are provided with angular recesses 302, 302', the depth of which is equal to the thickness of the boss z of hooks Z. A cam 252 carried by a spindle 253 serves to actuate the tongs. Spindle 253 is journalled in a suitable bearing to frame 255 and is prolonged at its upper part by a square shaped portion 254 itself prolonged by a threaded rod 256. An arm 259 having a square hole 258 is fitted on square portion 254 and maintained by means of a nut 257. The end of arm 259 is connected through a pin 261 to a fork-shaped portion 260 of a rod 263, the other end of which is also fork-shaped at 264. The latter end 264 carries a spindle 265 with which is jointed the end of a bent lever 266 pivoting about a stationary spindle 267. The other end of said lever 266 carries a roller 268 moving in the groove of a cam 269 keyed on main shaft N.

Cam 269 imparts to cam 252 through the system of rods above described, an oscillating movement which causes the tongs to be successively closed and opened, the opening taking place under the action of spring 386 as soon as cam 252 ceases to act on branches 262, 262'.

The tongs for holding the fabric closes before the distributor O starts its forward movement and it remains closed for all the time of the clipping operation.

(d) Clipping tool

The clipping tool K (Figs. 21 and 39) consists of two symmetrical branches 272, 272' respectively pivoted about spindles 273, 273' which are carried by a projection part 300 of the frame. These branches are urged into their opening positions by a return spring 274. The front end of each of these branches comprises a movable clipping head 275, 275'. These clipping heads are each provided with a recess 301, 301' the depth of which corresponds to the thickness of hooks Z. The rear ends of branches 272, 272' comprises adjustable bearing surfaces consisting of a wedge 276, 276' carried by a screw 277, 277' combined with an adjusting wedge 278, 278' and an adjusting screw 279, 279'. A cam 280 having two sets of bosses and mounted loose on shaft N is driven by a pinion 282 meshing with a pinion 283 keyed on a shaft 284 carrying at its other end a pinion 285 in mesh with a pinion 286 keyed on main shaft N. The gear ratio of this gear train is such that the cam makes one revolution for two revolutions of main shaft N, which explains why two sets of bosses 287, 287' and 288, 288' are provided on the cam.

When portions ab, a'b' of cam 280 are brought against the bearing surfaces of branches 272, 272' of the clipping tool K, the clipping heads 275, 275' have between them the maximum space. During the corresponding rotation of the cam, the tongs J for driving the fabric remained open. Bosses 287, 287' now come into contact with the bearing surfaces of the branches of the clipping tool, which has for its effect to move toward each other the clipping heads 275, 275'. The recesses 301, 301' of these heads constitute, together with the corresponding recesses 302, 302' provided in the branches of the tongs for holding the fabric (which have just closed) a guiding chute, the cross section of which is identical to the cross section of the central feed chute. The distributor now moves forward until projection 204 releases the hook it carried. Said hook is therefore guided by the guiding chute thus formed, its boss passing in the space formed by the two recesses 302, 302'. The hook falls astride on the rounded edge of the flexible band. A nose 213 of oscillating lever 211 now presses on the top of the hook which it fully engages on the rounded edge of the flexible band, and the cam then applies its bosses 288, 288' against the bearing surfaces of tool K. This causes heads 275, 275' to be brought toward each other thus clipping the hook on the fabric. Then, while the distributor comes back to its position of rest, the cam further rotates and its portions ab, a'b' come into contact with the branches of tool K which corresponds to the maximum opening of said branches. During this operation the tongs for holding the fabric have released the flexible band which, under the action of its driving device moves forward a distance corresponding to the space between two adjacent hooks. Then the cycle of operation is again repeated.

(e) Semi-automatic driving device

The semi-automatic driving device L (Figs. 21, 22, 41, 42, 43 and 44) consists of a carriage having a reciprocating motion.

The movable reciprocating carriage comprises a longitudinal member 289, which constitutes the stationary branch of the driving system, and which is supported at both ends by side plates 290, 290'. These side plates carry, through screws 291, 291' roller tracks 292, 292' in contact with rollers 293, 293' held in box 294, 294' rigidly connected to frame 295. The carriage is completed by a movable clasping branch 304, the axis of articulation of which, 303 is journalled at both ends in side plates 290, 290'. A spring 305 engaged in housing 306 and 307 of the stationary and of the movable branches of the system respectively, urges the latter towards the open position. The longitudinal member 289 carries a boss 308 which in turn carries a spindle 309 maintained in position by a screw 309'. A cam 310 integral with operating handle 311 oscillates about spindle 309.

The carriage for the fabric driving device is actuated through a pinion 297 in mesh with a rack 296 rigidly fixed to the carriage. Said pinion 297 is keyed on a spindle 25 journalled in the frame 298 of the escapement block. Spindle 25 carries a ratchet wheel 312 provided with a free wheel device 313 which permits the movable carriage to be driven only in one direction.

On the other hand, the carriage is constantly urged toward the right hand side of Fig. 21 by a spring drum 24 connected with said carriage through a flexible band 387 fixed at one end to the periphery of said drum and at the other end to the left hand end (Fig. 21) of said carriage.

The frame 298 also carries through two pivots 314, 314' (Fig. 41) a member 315 adapted to oscillate about said pivots. A U-shaped metallic piece 316 is journalled on said pivots 314, 314'. Said metallic piece comprises a bent portion 317 (Figs. 41, 44) provided with an extension 318 bent at right angles, and on which is fixed a rotor 319. The latter is connected by a link 320 to one of the ends of a bell crank lever 321 provided with a sleeve 322 fitting on a spindle 323 carried by the frame. The end of lever 321 that is connected with link 320 is also connected to a fixed point 326 of the frame by a spring 325 which constantly urges the other end of the bell crank lever against cam 324 carried by the main shaft N.

The escapement block 315 comprises a stationary dog 327 and, behind the latter, a movable dog 328 adapted to pivot about a pin 329 and urged against a stop 388 by a spring 330. A stop 331 provided on the escapement block is adapted to cooperate with the underface of movable dog 328 so that when said dog is applied against said stop 331, its upper edge is located in the same plane as that of stationary dog 327. A spring 332 connected on the one hand to the escapement block and on the other hand to the frame constantly urges the block towards the position for which it is in contact with a lug 317. The operation of the driving device which has just been described is the following:

As long as the bell crank lever 321 remains in contact with the circular portion of cam 324, the play of the different connecting organs is such that stationary dog 327 is located in one of the teeth of ratchet wheel 312 which is thus blocked. The movable carriage urged by spring drum 24 cannot move. As soon as the end of bell crank lever 321 comes upon the boss of cam 324, its other end pushes link 320 towards the left. Said link therefore pulls through rod 319, the portion 318 of metallic piece 316. The lug 317 of said piece therefore rotates towards the front. The escapement block, which is subjected to the action of said lug 317, therefore rotates in the same direction, and the tooth of the ratchet wheel escapes from stationary dog 327. The carriage driven by the spring drum moves towards the right hand side of Fig. 21; and drives, through rack 296, the toothed wheel 297 and the ratchet wheel 312 that is rigidly fixed thereto. The latter therefore turns in the direction of the arrow of Fig. 41. The tooth that immediately follows the tooth that has just escaped from dog 327, comes into contact with the end of movable dog 328 which it rotates until said dog is stopped by stationary piece 331. This has for its effect to stop the carriage which has moved forward a distance corresponding to a tooth of the rack, that is, a distance equal to the interval between two adjacent hooks on the flexible band. As soon as the end of bell crank lever 321 has moved past the boss of cam 322, that is to say as soon as escapement has taken place, plug 317 comes back to its initial position driving together with it the escapement block 315 which turns about pivots 314, 314'. This rotation has for its effect to cause movable dog 328 to escape and, under the action of its spring 330, to take back the position shown in Fig. 41, while the tooth of ratchet wheel 312 that had been stopped by said movable dog remains in contact with stationary dog 317. The carriage is therefore stopped until the following escapement takes place, and allows it to move forward a distance corresponding to a tooth of the rack. It should be noted that escapement takes place immediately after the maximum opening of the clipping tool and of the tongs for driving the fabric, while the distributor is in the position of rest. It results therefrom that the movable carriage which constantly clasps the flexible band that must receive the hooks moves, at the time of the escapement, a length corresponding to the distance between two adjacent hooks. The following hooks can therefore be clipped subsequently according to the process that has just been described.

(f) *Device for automatically stopping the clipping operation*

The device M for automatically stopping the clipping operation (Figs. 21, 22, 42, 43 and 45) comprises a stationary stop 299 which controls the start of the clipping operation, and a movable stop 26 adapted to slide along a rack shaped rod 27 provided with a graduation, which movable stop determines the number of hooks to be set on the flexible band according to the length necessary for the fastener to be obtained.

The automatic stopping is ensured when this length is obtained, by a cam 29 rigidly fixed to the movable carriage and which comes into contact with a piece 28 pivoted about a spindle 333 and subjected to the action of a spring 334. This piece 28 is provided at its lower end with two branches, one of which comprises a stopping hook 335, and the other 336 carries through a pin 357 an oscillating stopping piece 338 provided with a stopping hook 338'. The tail 339 of said oscillating piece 338 is connected to the end of branch 336 through a spring 340.

A lever 30 adapted to move in a slot 341 of a part of the frame provided with a stop 342. This lever is provided at its end with a socket 343 keyed on a spindle 344 journalled between two pivots 345 and 346 carried by the frame. On this spindle 344 there is keyed a connecting rod 347 jointed to rod 348. The latter is jointed to the end of a bar 349 rigidly connected through a piece 350 to a plate 352 pivoting about a pin 351 rigidly carried by the frame. This oscillating plate 352 is provided with an aperture 352' (Fig. 45) for the passage of shaft N. It carries, through pivots 356 and 357, levers 354 and 355 connected by a cross member 358 so as to form a deformable parallelogram the displacement of which is possible owing to the fact that the ends of levers 354, 355 slide in apertures 359, 360 provided in a flange 361 of plate 352. Plate 352 further comprises two other apertures 362, 363. Lever 354 is provided on its under face with a fixed stop 364 which projects through aperture 362. Lever 355 is provided in a likewise manner with a fixed stop 365 which projects through aperture 363. Furthermore, lever 354 carries through pin 366 a flat spring 367, the underface of which carries a movable stop 368 which extends through an aperture of the same size provided in lever 354 and which projects through aperture 362 of plate 352. This movable stop has an inclined surface which is not visible on the drawings.

The oscillating lever 354 comprises, in the vicinity of its end, a forked portion 369 in which is journalled a spindle 370 about which pivots operating handle 371. Said handle is terminated by a tail 372 which, under the action of spring 374 interposed between the handle and the end of oscillating lever 354, penetrates into one of the notches 373, 373' provided in the upper edge of flange 361 of plate 352.

Figure 42:
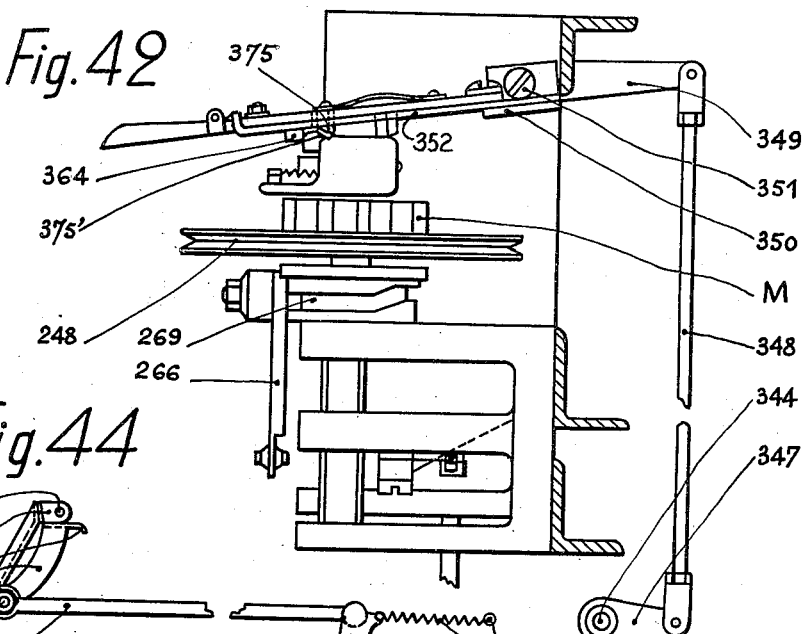
Fig. 42 is an end view of the device for automatically stopping the setting portion of the machine.
Figure 44:
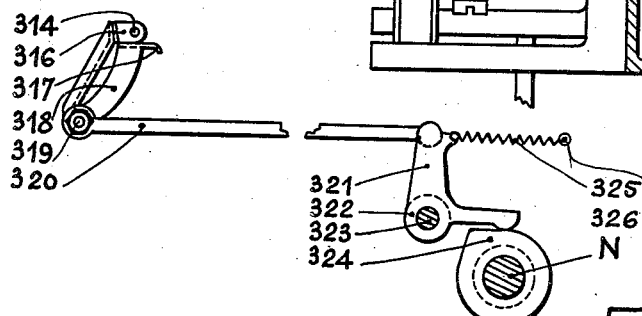
Fig. 44 is a plane view of the device for controlling the escapement block.
Figure 43:
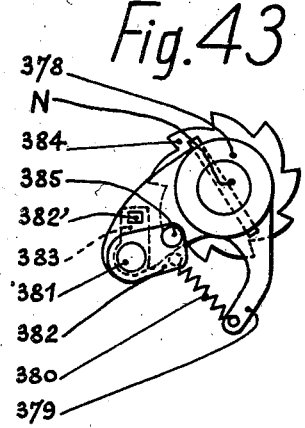
Fig. 43 is a plane view of the pawl serving to the automatic stopping.
Figure 45:
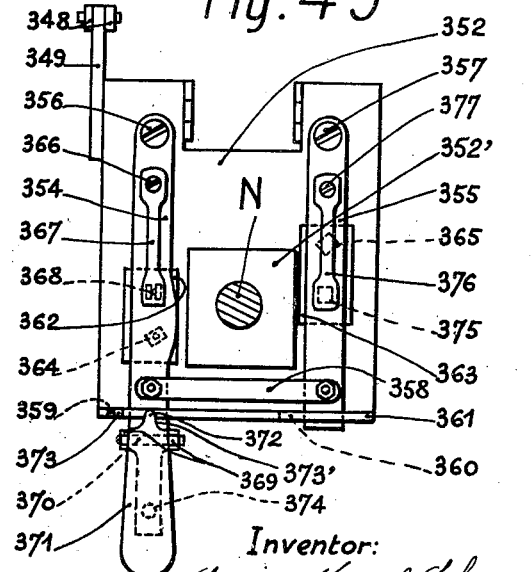
Fig. 45 is a plane view of the plate carrying the stop fingers.

The oscillating lever 355 carries, same as oscillating lever 354, a movable stop 375 provided with an inclined surface 375' (Fig. 42). This stop is fixed to the end of a flat spring 376 fixed at 377 to lever 355. On shaft N there is keyed (Fig. 43) a piece 378 having a stop 382' and a tail 379. Said tail 379 is connected through a spring 380 to an oscillating piece 382 provided with a stop 385 and rigidly fixed to a pin 381 journalled in piece 378. A pawl 383 keyed on said pin 381 is normally urged by spring 380 against the teeth of ratchet wheel 384 rigidly connected to the driving wheel 248, which is mounted loose on main shaft N.

Main shaft N is therefore driven through the system including ratchet wheel 384 which is rigidly connected to wheel 248, and pawl 383 which is acted upon by spring 380. As it has already been explained, the start of the clipping operation is determined by the contact of adjustable stop 26 with stationary stop 299. As long as the machine receives its movement from main shaft N driven through the pawl and the ratchet wheel that has just been described, the clipping tool automatically sets the hooks on the flexible band at suitable intervals. When the number of hooks to be fixed on the flexible band has been reached, which number is determined by the position of adjustable stop 26, cam 29 meets oscillating piece 28 and causes the latter to oscillate towards the right hand side. It results therefrom that nose 335 releases lever 30 which, under the action of its own weight, moves in its guide 341 and comes into contact with its stop 342. During that time oscillating piece 338 pivots under the effect of its spring 340 and brings its nose 338' opposite guide 341 thus preventing any upward displacement of operating lever 30 as long as the oscillating piece 28 has not been released.

The oscillating lever 30 rotates about pivots 345, 346, driving together with it connecting rod 347 (Fig. 21) which is moved upwardly and drives together with it rod 348 (Fig. 42). Said rod 348 meets, through bar 349, the downward rotation of oscillating plate 352 about spindle 351. Said plate 352 now presents its fixed stop 364 carried by lever 354 across the path of the stop 385 of piece 382. The latter therefore turns toward the left hand side, driving together with it, pawl 383 which releases ratchet wheel 384 which then turns loose on shaft N with wheel 248. Stop 382' meets the inclined surface 368' of movable stop 368 which yields and then comes back into position owing to its elastic support 367, thus immobilizing stop 382'. Main shaft N is therefore uncoupled and the machine is stopped, the tongs for holding the fabric and the clipping tool being in their open positions.

It then suffices for the operator, after having loosened movable jaw 304 by acting on handle 311 of cam 310, to move forward the flexible band a distance corresponding to the distance between two adjacent elements of the fastener, said elements consisting of two series of hooks clipped on said flexible band. The operator then moves the carriage backwards, owing to the freewheel device of the escapement until the adjustable stop 26 comes into contact with stationary stop 299. The movable jaw 304 is then brought back into clamping position against the flexible band. By moving upwardly the operating handle 30, the latter which engages under the hook 335 of oscillating piece 28 lifts oscillating plate 352. This has for its effect to release pawl 383 which comes into mesh with a tooth of ratchet wheel 384 and again drives main shaft N. The cycle above described is then repeated.

It should be noted that the length of the displacement of the carriage may be smaller than the length of the fastener that it is desired to obtain. In this case, the adjustable stop 26 is brought into the position that corresponds to half the useful length of the desired fastener. Then, nose 372 of the handle 371 through which lever 354 is operated is brought into notch 373 which deforms the jointed parallelogram so as to bring stops 375 and 365 of lever 355 across the path of stops 382' and 385. The pawl is uncoupled in the same manner as above described with an angular difference of half a revolution of shaft N. This angular difference has for its effect to stop the machine in the clipping position, which means that the tongs for holding the fabric remain closed on the flexible band, and that the clipping tool remains applied against the hook that is being clipped.

It results therefrom that the operator can without any risk of modifying the adjustments, bring the carriage back to its initial position in order to complete the half of the fastener that remains to be manufactured, and restarts the machine by acting on lever 30. However, it will be necessary for him to change the position of the jointed parallelogram of the oscillating plate in order to be able, at the end of the second displacement of the carriage, to move the fabric forward a length equal to the distance between two adjacent fastener elements. Operating lever 371 will therefore in this case be actuated for each stroke of the carriage. It should be well understood that fastener elements of any desired length can be obtained by dividing said length by a suitable number.

The semi-automatic system that has just been described has considerable advantages in some cases, but it necessitates the intervention of the operator for moving the carriage back to the zero position, and for adjusting the interval that must exist between two series of hooks clipped to the fabric. This disadvantage is further increased when the length of the desired fastener elements is greater than the length of the stroke of the carriage, because of the great number of operations to be performed.

These drawbacks can be obviated by the automatic control device which will be hereinafter described.

(g) *Automatic driving device*

In this embodiment of my invention, the reciprocating carriage L is done away with and replaced by two driving wheels 31 and 32. One of these wheels 32 is keyed on the escapement device 298 above described. Wheel 31 is supported by lever 33 movable about spindle 34, a spring 35 keeping it in contact with wheel 32.

The fabric 23 is held between these two wheels the tangential portion of which is located in the clipping pin, that is to say exactly under and at the centre of the two clipping heads of tool K.

In front of wheels 31 and 32 is located driving drum 36. The fabric 23 is applied thereon by a series of springs carrying rollers supported by a member 37 urged by a lever 37' provided with a return spring 37''. Drum 36 rotates freely about its spindle and is provided with a ratchet wheel 38. A pawl 39 driven by cam 40 keyed on shaft 284 (Fig. 21) through two levers 41 and 42 keyed on the same spindle 41' actuates ratchet wheel 38 after the clipping of each hook. Drum 36 further carries a toothed pinion 43 which meshes with a toothed wheel 44 keyed on the shaft of toothed wheel 45, which in turn meshes with a pinion 46 (Fig. 46). The base of pinion 46 carries a tooth 47 which drives the first drum 48 of a counter.

The gear ratios between these two wheels are such that a revolution of driving drum 36 corresponds to the clipping of forty hooks and produces four revolutions of drum 48.

The other wheels of the counter act by successive meshing as in all counters of that type.

Each of these wheels of the counter carries a movable ring 49 calculated from zero to 9 (Figs. 46 and 47). To number zero there corresponds a boss 50 capable of actuating an electric contact 51. All these contacts are connected in series so that current can only pass when all the contacts are closed, that is to say when all the rings of the counters have been brought back to zero.

For the manufacture of a series of fasteners of the same length, it is therefore necessary before starting the machine to make by means of rings 49, the number corresponding to the number of hooks to be clipped.

When the desired number of hooks has been clipped all the rings 49 come back to zero position and thus close the circuit of an electromagnet 390 shown in dotted lines in Fig. 21, acting by attraction of oscillating piece 28 which pivots about its spindle 333 and thus operates the automatic stop M as above described. The clipping operation is then stopped.

Lever 30 (Fig. 51) of the automatic stopping device carries an insulated piece 391 which itself supports a contact plate 392 which, when lever 30 moves downwardly closes the circuit of two contacts 393 and 394 supported by an insulated plate 395. Contact 393 is connected to one of the terminals (for instance the positive terminal) of a suitable source of energy, while plate 394 is connected to contact 396 of a distributor 52 having a contacting portion 52'.

This distributor actuates an electro-magnet 53 which controls the first displacement of an anchor escapement 54 permitting the rotation of a spindle 55. This spindle carries at its end (Figs. 46, 49) a pinion 397 provided with a free wheel device and in mesh with a rack 56 the smooth ends of which slide in bearings 398 and 398'. This rack, which is subjected to the action of a return spring 56' one of the ends of which is connected to member 398, comprises laterally an aperture 399 in which is slidably mounted a movable carriage 400 having the shape of a double T (Fig. 50) actuated by a connecting rod 401 jointed to a crank pin 402 keyed on a shaft 61.

A cam 57 keyed on shaft 55 acts on lever 33 that supports wheel 31 and moves the latter away from wheel 32. At that time the fabric 23 is no longer held by wheels 31 and 32.

At the beginning of the revolution of shaft 55, and simultaneously, a cam 58 acts on lever 59, permitting the whole of the counter to move downward a certain distance. This downward movement is controlled by a stirrup 60 (Figs. 46, 47) the function of which is to maintain the counting system in position. Teeth 47 have left the teeth of toothed wheel 46. The main shaft 61 that supports the whole of the counters and wheel 36 is provided with a series of lugs 62. On the other hand, each of the counter wheels carries a lug 63. The downward movement of the counter brings lugs 63 across the path of travel of lugs 62. As shaft 55 further rotates, it causes, through cam 64 and lever 65, one piece 66 to be pushed away, which in turn allows automatic stopping device 67 to mesh with pulley 68. Pulley 68 is constantly rotated by the motor that drives the whole of the clipping system.

The automatic stopping device 67 keyed on shaft 61 is so adjusted that it makes only one complete revolution and always stops at a determined point. Owing to the revolution of shaft 61, lugs 62 have come into contact with lugs 63 that drive wheels 48 thus bringing them back into their initial positions. Shaft 61, simultaneously drives through free-wheeel 69 and gear trains T, T' driving drum 36, thus moving the fabric the desired length between two series of clips.

The first period of the escapement is now completed.

The second period will now begin:

Shaft 55, in its present position, has brought distributor 52 into contact with brush 70. Under stirrup 60 (Figs. 46, 47), a ring 71 acting as a cam in turn closes the circuit. Through the intermediary of contacts 72, of brush 70 and of distributor 52, an electro-magnet 73, controls the second period of the operation of escapement 53. This has for its effect to allow shaft 55 to complete its rotation. Cam 58 keyed on shaft 55 through lever 59 lifts stirrup 60 which has for its effect to bring tooth 47 back into mesh with pinion 46. Stirrup 60, by moving upwardly drives the whole of the wheels of the counter and removes lugs 63 from the path of lug 62. Wheel 31 again applies flexible band 23 against wheel 32. Stirrup 60, in its upward movement, has acted on contact 403 which, through contact 404 and retarded relay 406 mounted on lever 30 closes the circuit of an electro-magnet having a plunger 405.

Contact 403 is connected to one of the terminals (the positive terminal in this case) of a suitable source of energy.

Electro-magnet 405 now pulls lever 30. The latter pivoting about its axis drives the retarded relay which begins to operate. This relay which is of a known type will be adjusted for a time of operation of three seconds. At the end of this time current will cease to flow through electro-magnet 405. During this time lever 30 has engaged with its stop, and, through the system of links above described it will act on automatic stopping device M thus starting the clipping system, and the cycle is repeated.

What I claim is:

1. A machine for the manufacture of zip fasteners consisting of a flexible band on which are clipped hooks comprising two branches and a boss provided with a recess, which machine comprises, in combination, means for separating the hooks supplied in bulk, an inclined guide, means for conveying the hooks from said separating means to said inclined guide, the said inclined guide comprising a slot the width of which is such that the branches of the hooks can pass therethrough but that the bosses cannot, so that said hooks are hung by said bosses in said slot and move by gravity along said guide in this position, said slot being provided with two notches, each on one side thereof, and at a certain distance from each other along said inclined guide, which notches are of such a size as to allow the boss of a hook to pass therethrough, two downwardly extending chutes adapted to accommodate the branches of said hooks connected to said slots respectively, these chutes being each provided with a groove adapted to accommodate the hook bosses and connected with one of said notches respectively, clipping means for guiding the flexible band and clipping the hooks thereto, and means for conveying the hooks from said chutes to said clipping means.

2. A machine according to claim 1 in which said separating means comprise, in combination, a hopper, a conical member having a splayed end opening at the bottom of said hopper, a second conical member surrounding the first one but having its conicity in the opposite direction, a lid for said second conical member, and a plurality of small lugs carried by said lid and extending between said drum and said second mentioned conical member, the latter being provided with apertures located opposite said lugs.

3. A sorting and clipping machine for the manufacture of zip fasteners consisting of a flexible band on which are clipped hooks comprising two branches and a boss provided with a recess, which machine comprises in combination, means for separating the hooks supplied in bulk, an inclined guide, means for conveying the hooks from said separating means to said inclined guide, the said inclined guide comprising a slot the width of which is such that the branches of the hooks can pass therethrough but that the bosses cannot, so that said hooks are hung by their bosses in said slot and move by gravity along said guide in this position, said slot being provided with two notches each on one side thereof and at a certain distance from each other along said inclined guide, which notches are of such a size that they allow the boss of a hook to pass therethrough, two downwardly extending chutes adapted to accommodate the body of said hooks connected to said slots respectively, these two chutes being provided with two grooves respectively adapted to accommodate the hook bosses and connected with said notches respectively and located eccentrically with respect to said chutes, said chutes and said grooves forming several bends so as to straighten the hooks that are fed thereto, clipping means for guiding the flexible band and clipping the hooks thereto, means for vibrating said guide, and means for conveying the hooks from said chutes to said clipping means.

4. A sorting and clipping machine according to claim 3 in which the means for conveying the hooks from said chutes to said clipping means include two feed chutes each connected to one of the first mentioned chutes and one of which is twisted by 180° so that the hooks at the end thereof are parallelly disposed with respect to the hooks of the other feed chute.

5. A sorting and clipping machine according to claim 3 in which the means for conveying the hooks from said chutes to said clipping means include two feed chutes connected to said first mentioned chutes respectively, said machine further comprising an eliminator which includes in combination, two oscillating levers, fingers carried by said levers at different levels, said chutes being each provided with an aperture for said fingers, an oscillating shutter cooperating with said chute, means for successively bringing said fingers through said apertures, so that an upper finger supports the column of hook in the chute and another finger located under it drives out any hook that is not in the proper position through the aperture unmasked by said shutter, and means for operating said shutter.

6. A sorting and clipping machine according to claim 3 in which the means for conveying the hooks from said chutes to said clipping means include two feed chutes each connected to one of the first mentioned chutes and one of which is twisted by 180° so that the hooks at the end thereof are disposed parallelly to the hooks in the other feed chute, a central chute, and means for displacing said feed chutes so that either of them can be brought into register with the central chute, and means for obturating the end of the feed chute that is not connected with the central chute.

7. A sorting and clipping machine according to claim 3 in which the means for conveying the hooks from said chutes to said clipping means include two feed chutes each connected to one of the first mentioned chutes and one of which is twisted by 180° so that the hooks at the end thereof are disposed parallelly to the hooks in the other chute, a central chute, means for displacing said feed chutes so that either of them can be brought into register with the central chute, means for obturating the end of the feed chute that is not connected with the central chute, said central chute being provided with a groove in one of its walls that is eccentrically disposed along most of the length thereof, but is centrally disposed at the bottom of said central chute, a hammer adapted to strike on said central chute so as to release the hooks that might be wedged therein, and means for operating said hammer.

LUCIEN MARCEL SCHUNE.